(12) United States Patent
Singh et al.

(10) Patent No.: US 12,004,020 B2
(45) Date of Patent: Jun. 4, 2024

(54) TECHNIQUES FOR HANDLING CALLS ASSOCIATED WITH USER EQUIPMENT TRANSITION FROM DUAL ACTIVE MODE TO DUAL STANDBY MODE

(71) Applicant: QUALCOMM Incorporated, San Diego, CA (US)

(72) Inventors: Vikram Singh, San Diego, CA (US); Bhupesh Manoharlal Umatt, Poway, CA (US); Carlos Marcelo Dias Pazos, Carlsbad, CA (US); Cherng-Shung Hsu, San Diego, CA (US); Qingxin Chen, San Diego, CA (US); Yong Xie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/457,127

(22) Filed: Dec. 1, 2021

(65) Prior Publication Data

US 2022/0248274 A1 Aug. 4, 2022

Related U.S. Application Data

(60) Provisional application No. 63/143,536, filed on Jan. 29, 2021.

(51) Int. Cl.
*H04W 76/34* (2018.01)
*H04W 36/00* (2009.01)
*H04W 76/18* (2018.01)

(52) U.S. Cl.
CPC ....... *H04W 36/0022* (2013.01); *H04W 76/18* (2018.02); *H04W 76/34* (2018.02)

(58) Field of Classification Search
CPC . H04W 76/34; H04W 36/0022; H04W 76/18; H04W 36/28; H04W 36/14
See application file for complete search history.

(56) References Cited

U.S. PATENT DOCUMENTS

2013/0237226 A1* 9/2013 Periyalwar ............ H04L 69/321
455/552.1
2017/0265118 A1 9/2017 Zhang
2021/0153290 A1* 5/2021 Ahmad ................. H04W 76/16

FOREIGN PATENT DOCUMENTS

CN 110337128 A 10/2019
EP 3713370 A1 9/2020
(Continued)

OTHER PUBLICATIONS

International Search Report and Written Opinion—PCT/US2021/072701—ISA/EPO—dated May 24, 2022.
(Continued)

*Primary Examiner* — Anez C Ebrahim
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, while the UE is in an active session using a first radio access technology (RAT) associated with a first subscription of the UE, a call request via the first RAT, wherein the call request is associated with a second subscription of the UE. The UE may determine that the call request is received from a serving cell that is associated with fallback from the first RAT to a second RAT for calls. The UE may reject the call request or transition the second subscription to a third RAT based at least in part on the determination that the call request is received via the serving cell that is associated with fallback from the first RAT to the second RAT for calls. Numerous other aspects are described.

30 Claims, 16 Drawing Sheets

(56) References Cited

FOREIGN PATENT DOCUMENTS

| WO | WO-2017196744 A1 | 11/2017 |
| WO | WO-2020209620 A1 | 10/2020 |
| WO | WO-2021015502 A1 | 1/2021 |

OTHER PUBLICATIONS

Partial International Search Report—PCT/US2021/072701—ISA/EPO—dated Mar. 30, 2022.

* cited by examiner

TECHNIQUES FOR HANDLING CALLS ASSOCIATED WITH USER EQUIPMENT TRANSITION FROM DUAL ACTIVE MODE TO DUAL STANDBY MODE

CROSS-REFERENCE TO RELATED APPLICATION

This Patent Application claims priority to U.S. Provisional Patent Application No. 63/143,536, filed on Jan. 29, 2021, entitled "TECHNIQUES FOR HANDLING CALLS ASSOCIATED WITH USER EQUIPMENT TRANSITION FROM DUAL ACTIVE MODE TO DUAL STANDBY MODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for handling calls associated with user equipment transition from dual active mode to dual standby mode.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, while the UE is in an active session using a first radio access technology (RAT) associated with a first subscription of the UE, a call request via the first RAT, wherein the call request is associated with a second subscription of the UE; determining that the call request is received from a serving cell that is associated with fallback from the first RAT to a second RAT for calls; and rejecting the call request or transitioning the second subscription to a third RAT based at least in part on the determination that the call request is received via the serving cell that is associated with fallback from the first RAT to the second RAT for calls.

In some aspects, the method includes searching a database that stores information indicating whether one or more cells of the first RAT are associated with fallback from the first RAT to the second RAT for calls; and determining that the call request is received from the serving cell that is associated with fallback from the first RAT to the second RAT for calls based at least in part on searching the database.

In some aspects, the method includes storing, in the database, an indication that the serving cell is associated with fallback from the first RAT to the second RAT for calls based at least in part on receiving a command to fall back from the first RAT to the second RAT on the serving cell.

In some aspects, the method includes updating the information stored in the database based at least in part on receiving updated information from one or more other devices.

In some aspects, the method includes transmitting an indication that the serving cell is associated with fallback from the first RAT to the second RAT for calls based at least in part on receiving a command to fall back from the first RAT to the second RAT on the serving cell.

In some aspects, the method includes determining that the UE or the second subscription is not capable of supporting calls using the first RAT; and rejecting the call request or transitioning the second subscription to the third RAT based at least in part on the determination that the UE or the second subscription is not capable of supporting calls using the first RAT.

In some aspects, the method includes receiving, from the serving cell, a command to fall back from the first RAT to the second RAT for the call request; and determining that the call request is received from the serving cell that is associated with fallback from the first RAT to the second RAT for calls based at least in part on receiving the command.

In some aspects, the method includes ignoring the command.

In some aspects, the method includes outputting, via one or more output components of the UE, an indication that the call request was rejected based at least in part on rejecting the call request.

In some aspects, the method includes determining that the third RAT is available for communications of the UE; and rejecting the call request or transitioning the second subscription to the third RAT comprises transitioning the second subscription to the third RAT based at least in part on the determination that the third RAT is available for communications of the UE.

In some aspects, the method includes determining that the third RAT is not available for communications of the UE; and rejecting the call request or transitioning the second subscription to the third RAT comprises rejecting the call request based at least in part on the determination that the third RAT is not available for communications of the UE.

In some aspects, the method includes recording a missing call based at least in part on rejecting the call request.

In some aspects, the first RAT is a New Radio RAT, the second RAT is a Long Term Evolution RAT, and the third RAT is a wireless local area network RAT or a non-third generation partnership project access RAT.

In some aspects, a method of wireless communication performed by a UE includes determining, while the UE is in an active session using a first RAT associated with a first subscription of the UE, that a serving cell is associated with fallback from the first RAT to a second RAT for calls, wherein the UE is camped on the serving cell using a second subscription and the first RAT; and transitioning the second subscription to a third RAT based at least in part on the determination that the serving cell is associated with fallback from the first RAT to the second RAT for calls.

In some aspects, the method includes determining that the third RAT is available for communications of the UE; and transitioning the second subscription to the third RAT based at least in part on the determination that the third RAT is available for communications of the UE.

In some aspects, transitioning the second subscription to the third RAT comprises transitioning an Internet Protocol Multimedia Subsystem (IMS) protocol data unit (PDU) session from the first RAT to the third RAT.

In some aspects, the method includes blocking handover, associated with the second subscription, from the third RAT to the first RAT until the active session is terminated.

In some aspects, the first RAT is a New Radio RAT, the second RAT is a Long Term Evolution RAT, and the third RAT is a wireless local area network RAT or a non-third generation partnership project access RAT.

In some aspects, a method of wireless communication performed by a UE includes determining that the UE is in an active session using a first RAT associated with a first subscription of the UE; determining that a second subscription of the UE is associated with a call on hold using the first RAT while the UE is in the active session using the first RAT associated with the first subscription of the UE; and blocking transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE.

In some aspects, the method includes receiving an inter-RAT measurement control command to transmit the inter-RAT measurement report; and ignoring the inter-RAT measurement control command based at least in part on the determination that the second subscription of the UE is associated with the call on hold using the first RAT while the UE is in the active session using the first RAT associated with the first subscription of the UE.

In some aspects, the method includes determining that at least one of the active session or the call on hold is terminated; and unblocking transmission of one or more inter-RAT measurement reports based at least in part on the determination that at least one of the active session or the call on hold is terminated to enable the UE to transmit the one or more inter-RAT measurement reports based at least in part on an inter-RAT measurement control command.

In some aspects, the first RAT is a New Radio RAT and the second RAT is a Long Term Evolution RAT.

In some aspects, a method of wireless communication performed by a UE includes determining, while the UE is in an active session using a first RAT associated with a first subscription of the UE and while a second subscription of the UE is associated with a call on hold using a third RAT, that a serving cell, on which the UE is camped using the second subscription and the first RAT, is associated with fallback from the first RAT to a second RAT for calls; and disabling handover from the third RAT to the first RAT for the second subscription based at least in part on the determination that the serving cell is associated with fallback from the first RAT to the second RAT for calls.

In some aspects, the method includes determining that at least one of the active session or the call on hold is terminated; and enabling handover from the third RAT to the first RAT based at least in part on the determination that at least one of the active session or the call on hold is terminated.

In some aspects, the first RAT is a New Radio RAT, the second RAT is a Long Term Evolution RAT, and the third RAT is a wireless local area network RAT or a non-third generation partnership project access RAT.

In some aspects, a UE for wireless communication includes a memory; and one or more processors operatively coupled to the memory, the memory and the one or more processors configured to: receive, while the UE is in an active session using a first RAT associated with a first subscription of the UE, a call request via the first RAT, wherein the call request is associated with a second subscription of the UE; determine that the call request is received from a serving cell that is associated with fallback from the first RAT to a second RAT for calls; and reject the call request or transition the second subscription to a third RAT based at least in part on the determination that the call request is received via the serving cell that is associated with fallback from the first RAT to the second RAT for calls.

In some aspects, the UE is further configured to: search a database that stores information indicating whether one or more cells of the first RAT are associated with fallback from the first RAT to the second RAT for calls; and determine that the call request is received from the serving cell that is associated with fallback from the first RAT to the second RAT for calls based at least in part on searching the database.

In some aspects, the UE is further configured to store, in the database, an indication that the serving cell is associated with fallback from the first RAT to the second RAT for calls based at least in part on receiving a command to fall back from the first RAT to the second RAT on the serving cell.

In some aspects, the UE is further configured to update the information stored in the database based at least in part on receiving updated information from one or more other devices.

In some aspects, the UE is further configured to transmit an indication that the serving cell is associated with fallback from the first RAT to the second RAT for calls based at least in part on receiving a command to fall back from the first RAT to the second RAT on the serving cell.

In some aspects, the UE is further configured to: determine that the UE or the second subscription is not capable of supporting calls using the first RAT; and reject the call request or transition the second subscription to the third RAT based at least in part on the determination that the UE or the second subscription is not capable of supporting calls using the first RAT.

In some aspects, the UE is further configured to: receive, from the serving cell, a command to fall back from the first RAT to the second RAT for the call request; and determine that the call request is received from the serving cell that is associated with fallback from the first RAT to the second RAT for calls based at least in part on receiving the command.

In some aspects, the UE is further configured to ignore the command.

In some aspects, the UE is further configured to output, via one or more output components of the UE, an indication that the call request was rejected based at least in part on rejecting the call request.

In some aspects, the UE is further configured to determine that the third RAT is available for communications of the UE; and the UE, when rejecting the call request or transitioning the second subscription to the third RAT, is configured to transition the second subscription to the third RAT based at least in part on the determination that the third RAT is available for communications of the UE.

In some aspects, the UE is further configured to determine that the third RAT is not available for communications of the UE; and the UE, when rejecting the call request or transitioning the second subscription to the third RAT, is configured to reject the call request based at least in part on the determination that the third RAT is not available for communications of the UE.

In some aspects, the UE is further configured to record a missing call based at least in part on rejecting the call request.

In some aspects, the first RAT is a New Radio RAT, the second RAT is a Long Term Evolution RAT, and the third RAT is a wireless local area network RAT or a non-third generation partnership project access RAT.

In some aspects, a UE for wireless communication includes a memory; and one or more processors operatively coupled to the memory, the memory and the one or more processors configured to: determine, while the UE is in an active session using a first RAT associated with a first subscription of the UE, that a serving cell is associated with fallback from the first RAT to a second RAT for calls, wherein the UE is camped on the serving cell using a second subscription and the first RAT; and transition the second subscription to a third RAT based at least in part on the determination that the serving cell is associated with fallback from the first RAT to the second RAT for calls.

In some aspects, the UE is further configured to determine that the third RAT is available for communications of the UE; and transition the second subscription to the third RAT based at least in part on the determination that the third RAT is available for communications of the UE.

In some aspects, the UE, when transitioning the second subscription to the third RAT, is configured to transition an IMS PDU session from the first RAT to the third RAT.

In some aspects, the UE is further configured to block handover, associated with the second subscription, from the third RAT to the first RAT until the active session is terminated.

In some aspects, the first RAT is a New Radio RAT, the second RAT is a Long Term Evolution RAT, and the third RAT is a wireless local area network RAT or a non-third generation partnership project access RAT.

In some aspects, a UE for wireless communication includes a memory; and one or more processors operatively coupled to the memory, the memory and the one or more processors configured to: determine that the UE is in an active session using a first RAT associated with a first subscription of the UE; determine that a second subscription of the UE is associated with a call on hold using the first RAT while the UE is in the active session using the first RAT associated with the first subscription of the UE; and block transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE.

In some aspects, the UE is further configured to: receive an inter-RAT measurement control command to transmit the inter-RAT measurement report; and ignore the inter-RAT measurement control command based at least in part on the determination that the second subscription of the UE is associated with the call on hold using the first RAT while the UE is in the active session using the first RAT associated with the first subscription of the UE.

In some aspects, the UE is further configured to: determine that at least one of the active session or the call on hold is terminated; and unblock transmission of one or more inter-RAT measurement reports based at least in part on the determination that at least one of the active session or the call on hold is terminated to enable the UE to transmit the one or more inter-RAT measurement reports based at least in part on an inter-RAT measurement control command.

In some aspects, the first RAT is a New Radio RAT and the second RAT is a Long Term Evolution RAT.

In some aspects, a UE for wireless communication includes a memory; and one or more processors operatively coupled to the memory, the memory and the one or more processors configured to: determine, while the UE is in an active session using a first RAT associated with a first subscription of the UE and while a second subscription of the UE is associated with a call on hold using a third RAT, that a serving cell, on which the UE is camped using the second subscription and the first RAT, is associated with fallback from the first RAT to a second RAT for calls; and disable handover from the third RAT to the first RAT for the second subscription based at least in part on the determination that the serving cell is associated with fallback from the first RAT to the second RAT for calls.

In some aspects, the UE is further configured to: determine that at least one of the active session or the call on hold is terminated; and enable handover from the third RAT to the first RAT based at least in part on the determination that at least one of the active session or the call on hold is terminated.

In some aspects, the first RAT is a New Radio RAT, the second RAT is a Long Term Evolution RAT, and the third RAT is a wireless local area network RAT or a non-third generation partnership project access RAT.

In some aspects, a non-transitory computer-readable medium storing a set of instructions for wireless communication includes one or more instructions that, when executed by one or more processors of a UE, cause the UE to: receive, while the UE is in an active session using a first RAT associated with a first subscription of the UE, a call request via the first RAT, wherein the call request is associated with a second subscription of the UE; determine that the call request is received from a serving cell that is associated with fallback from the first RAT to a second RAT for calls; and reject the call request or transition the second subscription to a third RAT based at least in part on the determination that the call request is received via the serving cell that is associated with fallback from the first RAT to the second RAT for calls.

In some aspects, the one or more instructions further cause the UE to: search a database that stores information indicating whether one or more cells of the first RAT are associated with fallback from the first RAT to the second RAT for calls; and determine that the call request is received from the serving cell that is associated with fallback from the first RAT to the second RAT for calls based at least in part on searching the database.

In some aspects, the one or more instructions further cause the UE to store, in the database, an indication that the serving cell is associated with fallback from the first RAT to the second RAT for calls based at least in part on receiving a command to fall back from the first RAT to the second RAT on the serving cell.

In some aspects, the one or more instructions further cause the UE to update the information stored in the database based at least in part on receiving updated information from one or more other devices.

In some aspects, the one or more instructions further cause the UE to transmit an indication that the serving cell is associated with fallback from the first RAT to the second RAT for calls based at least in part on receiving a command to fall back from the first RAT to the second RAT on the serving cell.

In some aspects, the one or more instructions further cause the UE to: determine that the UE or the second subscription is not capable of supporting calls using the first RAT; and reject the call request or transition the second subscription to the third RAT based at least in part on the determination that the UE or the second subscription is not capable of supporting calls using the first RAT.

In some aspects, the one or more instructions further cause the UE to: receive, from the serving cell, a command to fall back from the first RAT to the second RAT for the call request; and determine that the call request is received from the serving cell that is associated with fallback from the first RAT to the second RAT for calls based at least in part on receiving the command.

In some aspects, the one or more instructions further cause the UE to ignore the command.

In some aspects, the one or more instructions further cause the UE to output, via one or more output components of the UE, an indication that the call request was rejected based at least in part on rejecting the call request.

In some aspects, the one or more instructions further cause the UE to determine that the third RAT is available for communications of the UE; and the one or more instructions, that cause the UE to reject the call request or transition the second subscription to the third RAT, cause the UE to transition the second subscription to the third RAT based at least in part on the determination that the third RAT is available for communications of the UE.

In some aspects, the one or more instructions further cause the UE to determine that the third RAT is not available for communications of the UE; and the one or more instructions, that cause the UE to reject the call request or transition the second subscription to the third RAT, cause the UE to reject the call request based at least in part on the determination that the third RAT is not available for communications of the UE.

In some aspects, the one or more instructions further cause the UE to record a missing call based at least in part on rejecting the call request.

In some aspects, the first RAT is a New Radio RAT, the second RAT is a Long Term Evolution RAT, and the third RAT is a wireless local area network RAT or a non-third generation partnership project access RAT.

In some aspects, a non-transitory computer-readable medium storing a set of instructions for wireless communication includes one or more instructions that, when executed by one or more processors of a UE, cause the UE to: determine, while the UE is in an active session using a first RAT associated with a first subscription of the UE, that a serving cell is associated with fallback from the first RAT to a second RAT for calls, wherein the UE is camped on the serving cell using a second subscription and the first RAT; and transition the second subscription to a third RAT based at least in part on the determination that the serving cell is associated with fallback from the first RAT to the second RAT for calls.

In some aspects, the one or more instructions further cause the UE to determine that the third RAT is available for communications of the UE; and transition the second subscription to the third RAT based at least in part on the determination that the third RAT is available for communications of the UE.

In some aspects, the one or more instructions, that cause the UE to transition the second subscription to the third RAT, cause the UE to transition an IMS PDU session from the first RAT to the third RAT.

In some aspects, the one or more instructions further cause the UE to block handover, associated with the second subscription, from the third RAT to the first RAT until the active session is terminated.

In some aspects, the first RAT is a New Radio RAT, the second RAT is a Long Term Evolution RAT, and the third RAT is a wireless local area network RAT or a non-third generation partnership project access RAT.

In some aspects, a non-transitory computer-readable medium storing a set of instructions for wireless communication includes one or more instructions that, when executed by one or more processors of a UE, cause the UE to: determine that the UE is in an active session using a first RAT associated with a first subscription of the UE; determine that a second subscription of the UE is associated with a call on hold using the first RAT while the UE is in the active session using the first RAT associated with the first subscription of the UE; and block transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE.

In some aspects, the one or more instructions further cause the UE to: receive an inter-RAT measurement control command to transmit the inter-RAT measurement report; and ignore the inter-RAT measurement control command based at least in part on the determination that the second subscription of the UE is associated with the call on hold using the first RAT while the UE is in the active session using the first RAT associated with the first subscription of the UE.

In some aspects, the one or more instructions further cause the UE to: determine that at least one of the active session or the call on hold is terminated; and unblock transmission of one or more inter-RAT measurement reports based at least in part on the determination that at least one of the active session or the call on hold is terminated to enable the UE to transmit the one or more inter-RAT measurement reports based at least in part on an inter-RAT measurement control command.

In some aspects, the first RAT is a New Radio RAT and the second RAT is a Long Term Evolution RAT.

In some aspects, a non-transitory computer-readable medium storing a set of instructions for wireless communication includes one or more instructions that, when executed by one or more processors of a UE, cause the UE to: determine, while the UE is in an active session using a first RAT associated with a first subscription of the UE and while a second subscription of the UE is associated with a call on hold using a third RAT, that a serving cell, on which the UE is camped using the second subscription and the first RAT, is associated with fallback from the first RAT to a second RAT for calls; and disable handover from the third RAT to the first RAT for the second subscription based at least in part on the determination that the serving cell is associated with fallback from the first RAT to the second RAT for calls.

In some aspects, the one or more instructions further cause the UE to: determine that at least one of the active session or the call on hold is terminated; and enable handover from the third RAT to the first RAT based at least in part on the determination that at least one of the active session or the call on hold is terminated.

In some aspects, the first RAT is a New Radio RAT, the second RAT is a Long Term Evolution RAT, and the third RAT is a wireless local area network RAT or a non-third generation partnership project access RAT.

In some aspects, an apparatus for wireless communication includes means for receiving, while the apparatus is in an active session using a first RAT associated with a first subscription of the apparatus, a call request via the first RAT, wherein the call request is associated with a second subscription of the apparatus; means for determining that the call request is received from a serving cell that is associated with fallback from the first RAT to a second RAT for calls; and means for rejecting the call request or transitioning the second subscription to a third RAT based at least in part on the determination that the call request is received via the serving cell that is associated with fallback from the first RAT to the second RAT for calls.

In some aspects, the apparatus includes means for searching a database that stores information indicating whether one or more cells of the first RAT are associated with fallback from the first RAT to the second RAT for calls; and means for determining that the call request is received from the serving cell that is associated with fallback from the first RAT to the second RAT for calls based at least in part on searching the database.

In some aspects, the apparatus includes means for storing, in the database, an indication that the serving cell is associated with fallback from the first RAT to the second RAT for calls based at least in part on receiving a command to fall back from the first RAT to the second RAT on the serving cell.

In some aspects, the apparatus includes means for updating the information stored in the database based at least in part on receiving updated information from one or more other devices.

In some aspects, the apparatus includes means for transmitting an indication that the serving cell is associated with fallback from the first RAT to the second RAT for calls based at least in part on receiving a command to fall back from the first RAT to the second RAT on the serving cell.

In some aspects, the apparatus includes means for determining that the apparatus or the second subscription is not capable of supporting calls using the first RAT; and means for rejecting the call request or transitioning the second subscription to the third RAT based at least in part on the determination that the apparatus or the second subscription is not capable of supporting calls using the first RAT.

In some aspects, the apparatus includes means for receiving, from the serving cell, a command to fall back from the first RAT to the second RAT for the call request; and means for determining that the call request is received from the serving cell that is associated with fallback from the first RAT to the second RAT for calls based at least in part on receiving the command.

In some aspects, the apparatus includes means for ignoring the command.

In some aspects, the apparatus includes means for outputting, via one or more output components of the apparatus, an indication that the call request was rejected based at least in part on rejecting the call request.

In some aspects, the apparatus includes means for determining that the third RAT is available for communications of the apparatus; and the means for rejecting the call request or transitioning the second subscription to the third RAT comprises means for transitioning the second subscription to the third RAT based at least in part on the determination that the third RAT is available for communications of the apparatus.

In some aspects, the apparatus includes means for determining that the third RAT is not available for communications of the apparatus; and the means for rejecting the call request or transitioning the second subscription to the third RAT comprises means for rejecting the call request based at least in part on the determination that the third RAT is not available for communications of the apparatus.

In some aspects, the apparatus includes means for recording a missing call based at least in part on rejecting the call request.

In some aspects, the first RAT is a New Radio RAT, the second RAT is a Long Term Evolution RAT, and the third RAT is a wireless local area network RAT or a non-third generation partnership project access RAT.

In some aspects, an apparatus for wireless communication includes means for determining, while the apparatus is in an active session using a first RAT associated with a first subscription of the apparatus, that a serving cell is associated with fallback from the first RAT to a second RAT for calls, wherein the apparatus is camped on the serving cell using a second subscription and the first RAT; and means for transitioning the second subscription to a third RAT based at least in part on the determination that the serving cell is associated with fallback from the first RAT to the second RAT for calls.

In some aspects, the apparatus includes means for determining that the third RAT is available for communications of the apparatus; and means for transitioning the second subscription to the third RAT based at least in part on the determination that the third RAT is available for communications of the apparatus.

In some aspects, the means for transitioning the second subscription to the third RAT comprises means for transitioning an IMS PDU session from the first RAT to the third RAT.

In some aspects, the apparatus includes means for blocking handover, associated with the second subscription, from the third RAT to the first RAT until the active session is terminated.

In some aspects, the first RAT is a New Radio RAT, the second RAT is a Long Term Evolution RAT, and the third RAT is a wireless local area network RAT or a non-third generation partnership project access RAT.

In some aspects, an apparatus for wireless communication includes means for determining that the apparatus is in an active session using a first RAT associated with a first subscription of the apparatus; means for determining that a second subscription of the apparatus is associated with a call on hold using the first RAT while the apparatus is in the active session using the first RAT associated with the first subscription of the apparatus; and means for blocking transmission of an inter-RAT measurement report associated with the first RAT and a second RAT based at least in part on the determination that the second subscription of the apparatus is associated with the call on hold using the first RAT while the apparatus is in the active session using the first RAT associated with the first subscription of the apparatus.

In some aspects, the apparatus includes means for receiving an inter-RAT measurement control command to transmit the inter-RAT measurement report; and means for ignoring the inter-RAT measurement control command based at least in part on the determination that the second subscription of the apparatus is associated with the call on hold using the first RAT while the apparatus is in the active session using the first RAT associated with the first subscription of the apparatus.

In some aspects, the apparatus includes means for determining that at least one of the active session or the call on hold is terminated; and means for unblocking transmission of one or more inter-RAT measurement reports based at least in part on the determination that at least one of the active session or the call on hold is terminated to enable the apparatus to transmit the one or more inter-RAT measurement reports based at least in part on an inter-RAT measurement control command.

In some aspects, the first RAT is a New Radio RAT and the second RAT is a Long Term Evolution RAT.

In some aspects, an apparatus for wireless communication includes means for determining, while the apparatus is in an active session using a first RAT associated with a first subscription of the apparatus and while a second subscription of the apparatus is associated with a call on hold using a third RAT, that a serving cell, on which the apparatus is camped using the second subscription and the first RAT, is associated with fallback from the first RAT to a second RAT for calls; and means for disabling handover from the third RAT to the first RAT for the second subscription based at least in part on the determination that the serving cell is associated with fallback from the first RAT to the second RAT for calls.

In some aspects, the apparatus includes means for determining that at least one of the active session or the call on hold is terminated; and means for enabling handover from the third RAT to the first RAT based at least in part on the determination that at least one of the active session or the call on hold is terminated.

In some aspects, the first RAT is a New Radio RAT, the second RAT is a Long Term Evolution RAT, and the third RAT is a wireless local area network RAT or a non-third generation partnership project access RAT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
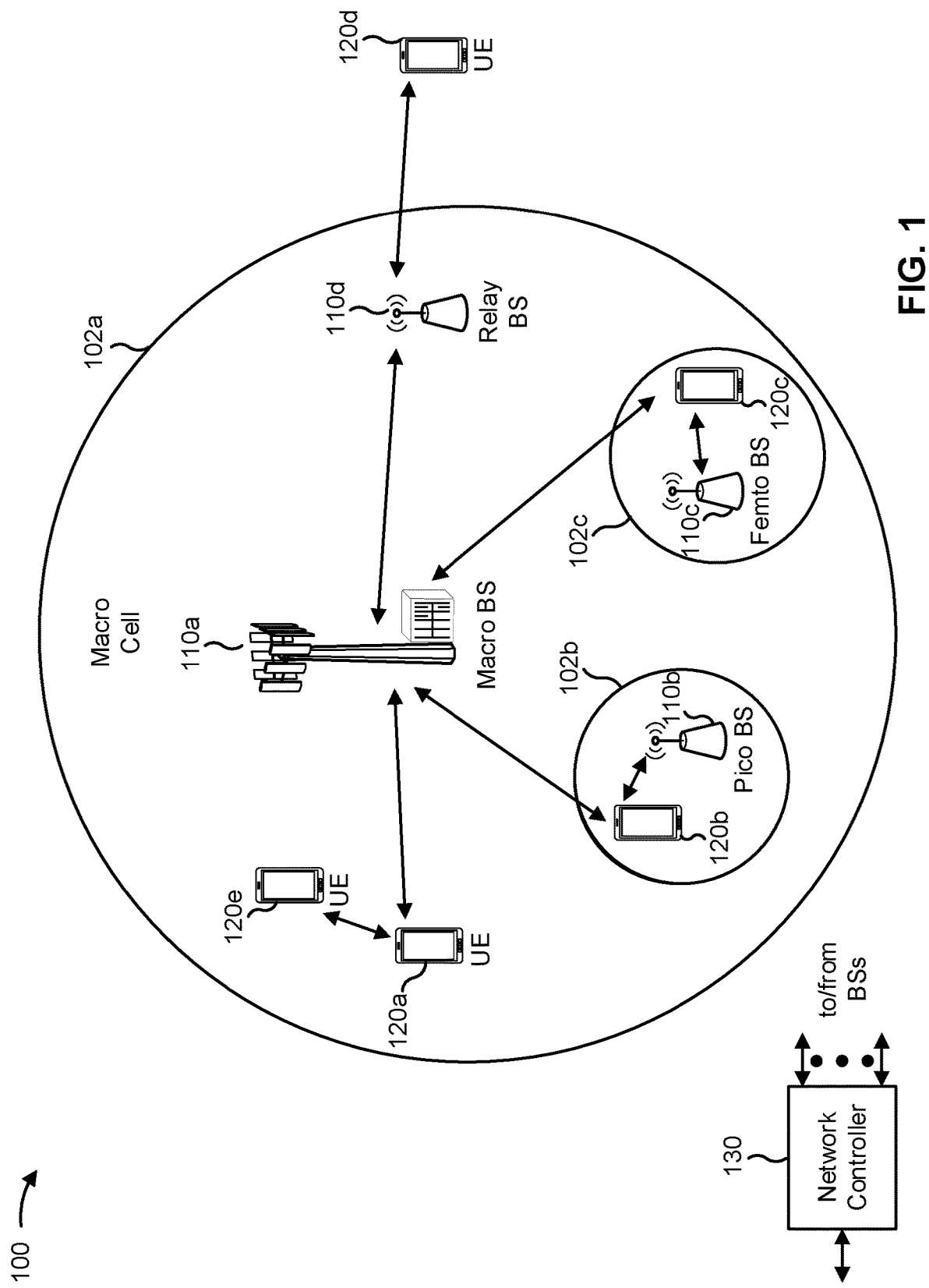
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
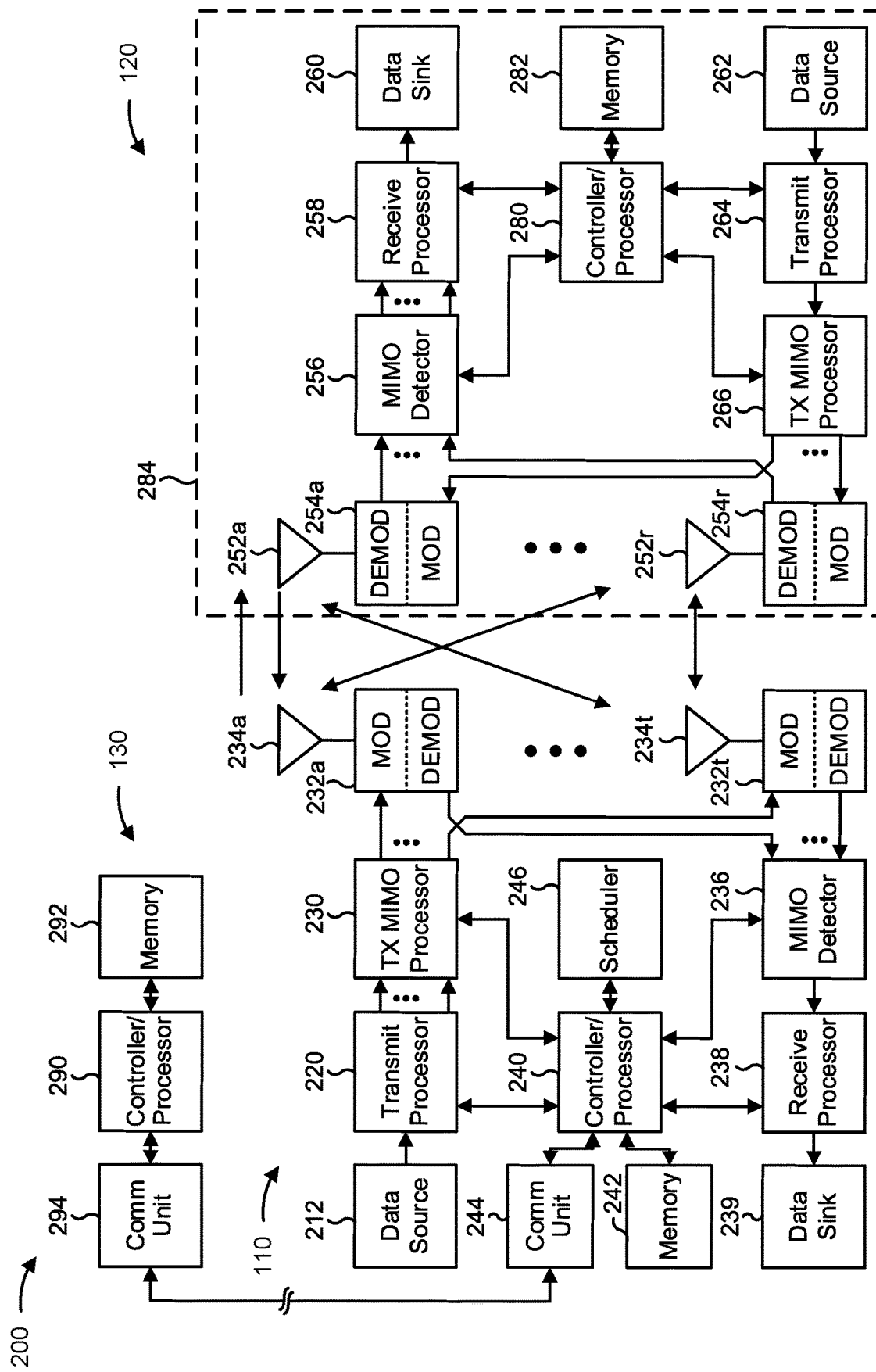
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with handling calls associated with UE transition from dual active mode to dual standby mode, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions.

In some aspects, the UE includes means for receiving, while the UE is in an active session using a first RAT associated with a first subscription of the UE, a call request via the first RAT, wherein the call request is associated with a second subscription of the UE; means for determining that the call request is received from a serving cell that is associated with fallback from the first RAT to a second RAT for calls; and/or means for rejecting the call request or transitioning the second subscription to a third RAT based at least in part on the determination that the call request is received via the serving cell that is associated with fallback from the first RAT to the second RAT for calls. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for searching a database that stores information indicating whether one or more cells of the first RAT are associated with fallback from the first RAT to the second RAT for calls; and/or means for determining that the call request is received from the serving cell that is associated with fallback from the first RAT to the second RAT for calls based at least in part on searching the database.

In some aspects, the UE includes means for storing, in the database, an indication that the serving cell is associated with fallback from the first RAT to the second RAT for calls based at least in part on receiving a command to fall back from the first RAT to the second RAT on the serving cell.

In some aspects, the UE includes means for updating the information stored in the database based at least in part on receiving updated information from one or more other devices.

In some aspects, the UE includes means for transmitting an indication that the serving cell is associated with fallback from the first RAT to the second RAT for calls based at least in part on receiving a command to fall back from the first RAT to the second RAT on the serving cell.

In some aspects, the UE includes means for determining that the UE or the second subscription is not capable of supporting calls using the first RAT; and/or means for rejecting the call request or transitioning the second subscription to the third RAT based at least in part on the determination that the UE or the second subscription is not capable of supporting calls using the first RAT.

In some aspects, the UE includes means for receiving, from the serving cell, a command to fall back from the first RAT to the second RAT for the call request; and/or means for determining that the call request is received from the serving cell that is associated with fallback from the first RAT to the second RAT for calls based at least in part on receiving the command.

In some aspects, the UE includes means for ignoring the command.

In some aspects, the UE includes means for outputting, via one or more output components of the UE, an indication that the call request was rejected based at least in part on rejecting the call request.

In some aspects, the UE includes means for determining that the third RAT is available for communications of the UE; and/or means for transitioning the second subscription to the third RAT based at least in part on the determination that the third RAT is available for communications of the UE.

In some aspects, the UE includes means for determining that the third RAT is not available for communications of the UE; and/or means for rejecting the call request based at least in part on the determination that the third RAT is not available for communications of the UE.

In some aspects, the UE includes means for recording a missing call based at least in part on rejecting the call request.

In some aspects, the UE includes means for determining, while the UE is in an active session using a first RAT associated with a first subscription of the UE, that a serving cell is associated with fallback from the first RAT to a second RAT for calls, wherein the UE is camped on the serving cell using a second subscription and the first RAT; and/or means for transitioning the second subscription to a third RAT based at least in part on the determination that the serving cell is associated with fallback from the first RAT to the second RAT for calls. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that the third RAT is available for communications of the UE; and/or means for transitioning the second subscription to the third RAT based at least in part on the determination that the third RAT is available for communications of the UE.

In some aspects, the UE includes means for blocking handover, associated with the second subscription, from the third RAT to the first RAT until the active session is terminated.

In some aspects, the UE includes means for determining that the UE is in an active session using a first RAT associated with a first subscription of the UE; means for determining that a second subscription of the UE is associated with a call on hold using the first RAT while the UE is in the active session using the first RAT associated with the first subscription of the UE; and/or means for blocking transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an inter-RAT measurement control command to transmit the inter-RAT measurement report; and/or means for ignoring the inter-RAT measurement control command based at least in part on the determination that the second subscription of the UE is associated with the call on hold using the first RAT while the UE is in the active session using the first RAT associated with the first subscription of the UE.

In some aspects, the UE includes means for determining, while the UE is in an active session using a first RAT associated with a first subscription of the UE and while a second subscription of the UE is associated with a call on hold using a third RAT, that a serving cell, on which the UE is camped using the second subscription and the first RAT, is associated with fallback from the first RAT to a second RAT for calls; and/or means for disabling handover from the third RAT to the first RAT for the second subscription based at least in part on the determination that the serving cell is associated with fallback from the first RAT to the second RAT for calls. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that at least one of the active session or the call on hold is terminated; and/or means for enabling handover from the third RAT to the first RAT based at least in part on the determination that at least one of the active session or the call on hold is terminated.

As indicated above, FIG. 2 is provided as an example. Other examples may differ from what is described with regard to FIG. 2.

Figure 3:
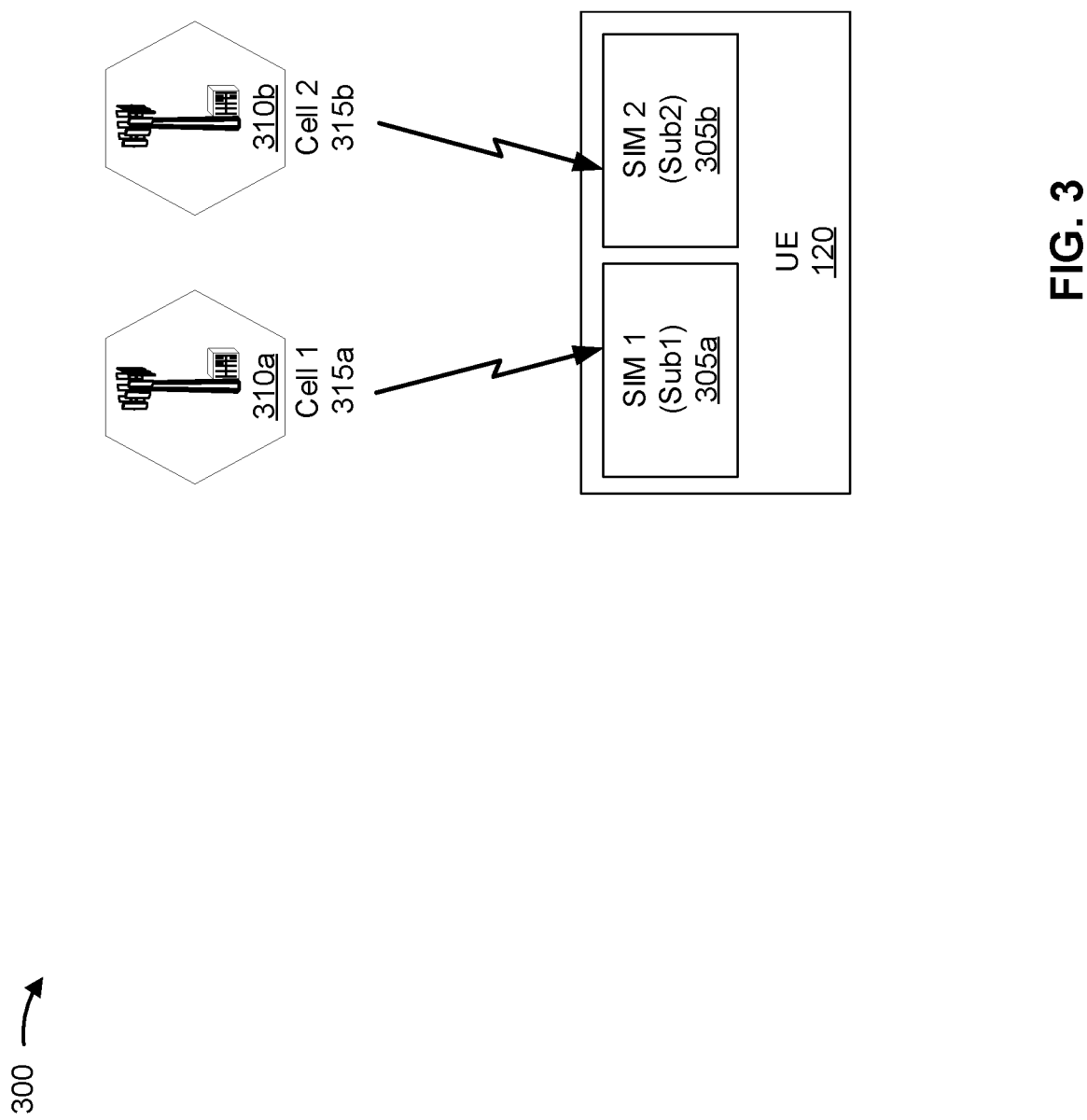
FIG. 3 is a diagram illustrating an example 300 of a multi-subscriber identity module (SIM) UE, in accordance with the present disclosure.

FIG. 3 is a diagram illustrating an example 300 of a multiple subscriber identity module (SIM) UE, in accordance with the present disclosure. As shown in FIG. 3, a UE 120 may be a multiple SIM (multi-SIM) UE that includes multiple SIMs (two or more SIMs), shown as a first SIM 305a and a second SIM 305b. The first SIM 305a may be associated with a first subscription (shown as Sub1), and the second SIM 305b may be associated with a second subscription (shown as Sub2). A subscription may be a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (Sub1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (Sub2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some cases, the first cell 315 and the second cell 315b may be provided by the same base station. Thus, in some aspects, the first base station 310a and the second base station 310b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 305a (and the first subscription) at the same time as communicating using the second SIM 305b (and the second subscription). For example, when the UE 120 is in an active session (e.g., a voice call or another latency sensitive service, such as online gaming, stock trading, or an over-the-top (OTT) service) using the first SIM 305a, the UE 120 is capable of receiving a notification of a voice call using the second SIM 305b without interrupting communications that use the first SIM 305a, and without tuning or switching away from the first cell 315a to tune to the second cell 315b.

In a DSDS mode, the UE 120 is not capable of concurrent active communication using both SIMS of the UE 120. Thus, a UE 120 in the DSDS mode is not capable of communicating using the first SIM 305a (and the first subscription) at the same time as communicating using the second SIM 305b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315a (as well as the first SIM 305b and the first subscription) uses an NR RAT and the second cell 315b (as well as the second SIM 305b and the second subscription) also uses the NR RAT. However, the UE 120 may not be capable of operating in a DSDA mode for NR+LTE, where one of the first cell 315a (as well as the first SIM 305b and the first subscription) uses an NR RAT and the second cell 315b (as well as the second SIM 305b and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

If a UE 120 is capable of operating in the DSDA mode for NR+NR, is not capable of operating in the DSDA mode for NR+LTE, and is capable of operating in the DSDS mode for NR+LTE, then the UE 120 may experience issues with voice calls if the UE 120 transitions from a DSDA mode to a DSDS mode. As an example, the UE 120 may transition from the DSDA mode to the DSDS mode if both the first cell 315a and the second cell 315b are using NR (and the UE 120 is thus capable of operating in the DSDA mode), and then one of the cells falls back to LTE. This may occur, for example, if the cell does not support voice calling using NR, sometimes referred to as voice over NR (VoNR). If the cell does not support VoNR, and a call request is transmitted via the cell, then the cell may fall back to LTE to handle the call using voice over LTE (VoLTE). As a result, if the UE 120 is on a VoNR call using the first cell 315a, and the UE 120 receives a voice call via the second cell 315b that does not support VoNR, the second cell 315b may fall back to LTE, and the UE 120 may transition from the DSDA mode to the DSDS mode to enable NR+LTE communication. Because the UE 120 is not capable of concurrent active communication in the DSDS mode, the UE 120 may remain on the VoNR call using the first cell 315a without receiving any notification and/or without notifying a user of the UE 120 of the voice call on the second cell 315b. Furthermore, a calling UE, that is calling the UE 120, may not receive a notification that the UE 120 is unable to answer the call. This results in a poor user experience and consumes excessive network resources due to continuously ringing the voice call on the second cell 315b rather than terminating the voice call on the second cell 315b. Some techniques and apparatuses described herein address these and other issues, thereby improving a user experience and conserving network resources.

As indicated above, FIG. 3 is provided as an example. Other examples may differ from what is described with regard to FIG. 3.

Figure 4:
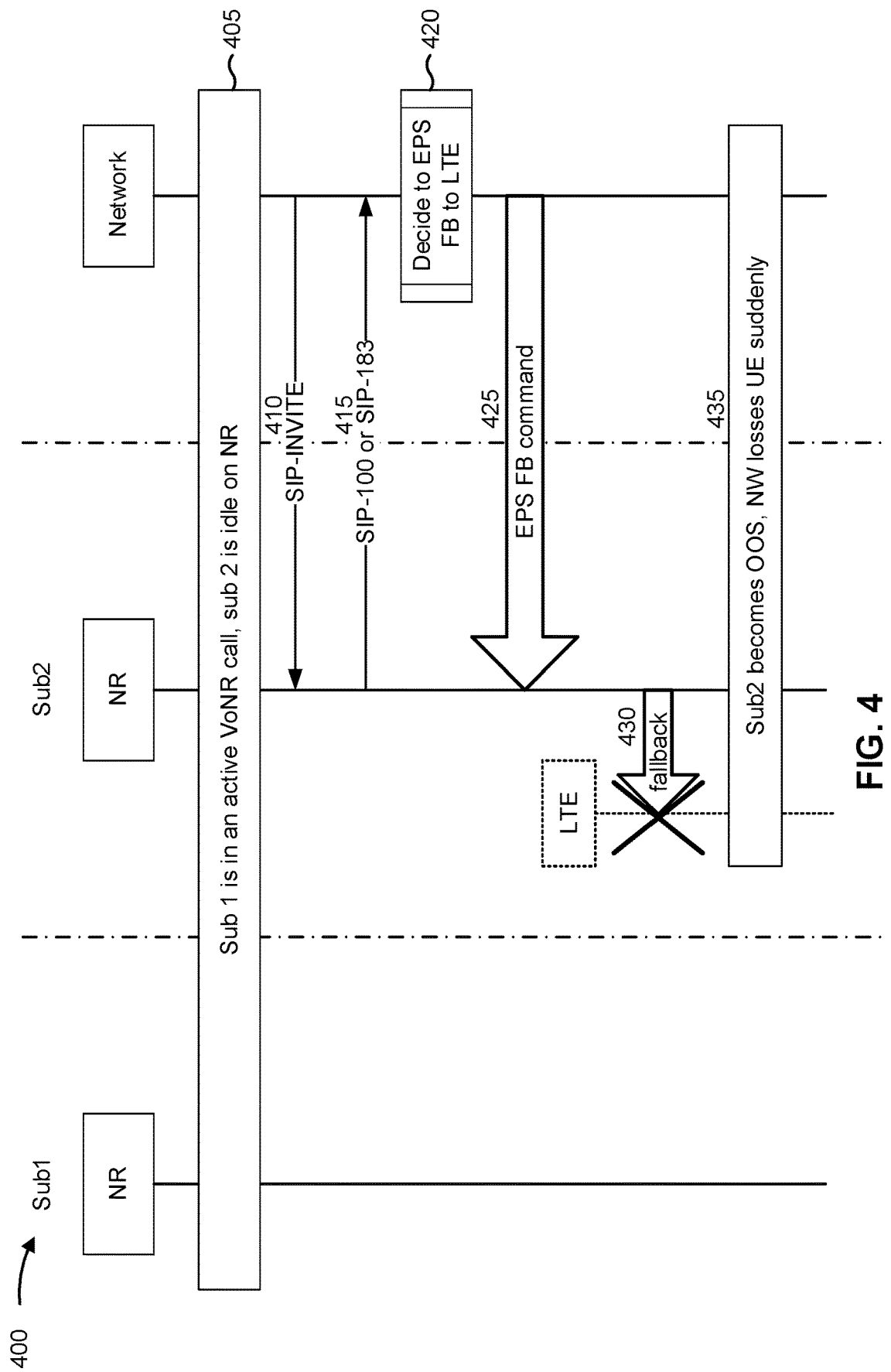
FIG. 4 is a diagram illustrating an example of a transition from a dual active mode to a dual standby mode, in accordance with the present disclosure.

FIG. 4 is a diagram illustrating an example 400 of a transition from a dual active mode to a dual standby mode, in accordance with the present disclosure. FIG. 4 shows an example transition from a DSDA mode, where NR is used for both a first subscription (shown as Sub1) of a UE 120 and a second subscription (shown as Sub2) of the UE 120, to a DSDS mode where NR is used for one subscription (Sub1 in this example) and LTE is used for the other subscription (Sub2 in this example). As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 405, the UE 120 may be in an active session using an NR RAT and using the first subscription of the UE 120. The UE 120 may also be in an idle session using the NR RAT and using the second subscription of the UE 120. If the UE 120 supports NR+NR DSDA, then the UE 120 may operate using the DSDA mode because both subscriptions are using NR. In some aspects, the active session on the first subscription may be a voice call (e.g., a VoNR call) or another type of session, such as an online gaming session, a stock trading session, an OTT session, a video call session, or the like. In some aspects, the active session may be delay sensitive or latency sensitive (e.g., due to a quality of service requirement). In some aspects, the UE 120 may be in a radio resource control (RRC) connected mode for the active session on the first subscription. In some aspects, the UE 120 may be in an IMS idle mode for the idle session on the second subscription (and may be in an RRC idle mode or an RRC connected mode).

As shown by reference number 410, the UE 120 may receive a call request using the NR RAT and the second subscription. In example 400, the call request is transmitted via a session initiation protocol (SIP) INVITE message. In some aspects, the call request is a request for a VoNR call. As shown by reference number 415, the UE 120 may transmit a response to the call request using the NR RAT and the second subscription. In example 400, the response is transmitted via a SIP 100 message (e.g., a SIP Trying message) or a SIP 183 message (e.g., a SIP Session Progress message).

As shown by reference number 420, the network may trigger fallback from the NR RAT to an LTE RAT. For example, the network may not be capable of supporting VoNR, and thus may trigger fallback to LTE to attempt to set up the call using VoLTE. A fallback from NR to LTE may be referred to as an evolved packet system (EPS) fallback (FB). As shown by reference number 425, the network may transmit a fallback command (e.g., an EPS FB command) to the UE 120 using the NR RAT and the second subscription. As a result, and as shown by reference number 430, the UE 120 may cause the second subscription to fallback to LTE to attempt to communicate via LTE rather than NR.

However, if the UE 120 does not support NR+LTE DSDA, then the UE 120 may transition from the NR+NR DSDA mode to an NR+LTE DSDS mode. As a result, the second subscription becomes out of service (OOS), and the UE 120 cannot communicate with the network using the second subscription, as shown by reference number 435. Thus, the UE 120 may be unable to accept the call request, and any information associated with the call request may be dropped. For example, the UE 120 may not receive information indicating that there is a missed call, may not receive information indicating a phone number of the missed call, or the like. This results in dropped call information and a poor user experience. Furthermore, the UE 120 may be unable to notify a calling UE, that is calling the UE 120, that the UE 120 is unavailable to accept the call request. As a result, the calling UE may continue to ring, thereby wasting network resources and resulting in a poor user experience for a user of the calling UE. Some techniques and apparatuses described herein address these and other issues, thereby improving a user experience and conserving network resources.

As indicated above, FIG. 4 is provided as an example. Other examples may differ from what is described with regard to FIG. 4.

Figure 5:
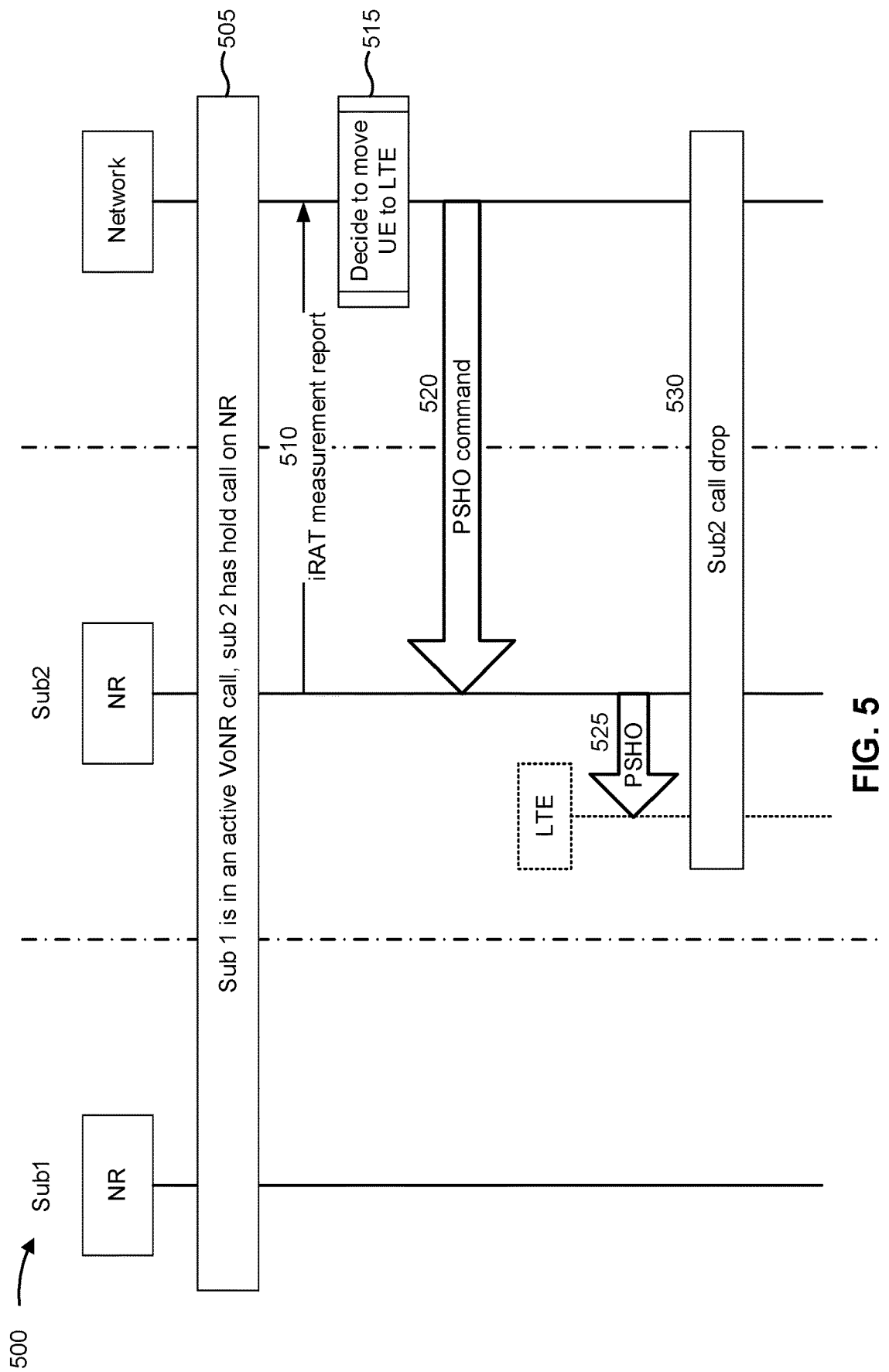
FIG. 5 is a diagram illustrating another example of a transition from a dual active mode to a dual standby mode, in accordance with the present disclosure.

FIG. 5 is a diagram illustrating an example 500 of a transition from a dual active mode to a dual standby mode, in accordance with the present disclosure. FIG. 5 shows an example transition from a DSDA mode, where NR is used for both a first subscription (shown as Sub1) of a UE 120 and a second subscription (shown as Sub2) of the UE 120, to a DSDS mode where NR is used for one subscription (Sub1 in this example) and LTE is used for the other subscription (Sub2 in this example). As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 505, the UE 120 may be in an active session using an NR RAT and using the first subscription of the UE 120. The UE 120 may also be in a held session using the NR RAT and using the second subscription of the UE 120. If the UE 120 supports NR+NR DSDA, then the UE 120 may operate using the DSDA mode because both subscriptions are using NR. In some aspects, the active session on the first subscription may be a voice call (e.g., a VoNR call) or another type of session, such as an online gaming session, a stock trading session, an OTT session, a video call session, or the like. In some aspects, the active session may be delay sensitive or latency sensitive (e.g., due to a quality of service requirement). In some aspects, the UE 120 may be in an RRC connected mode for the active session on the first subscription.

In some aspects, the held session may be a voice call that is on hold. For example, the UE 120 may receive a call request on the second subscription and may answer the call request to establish a call with another device. While the call is in progress, the UE 120 may receive a call request on the first subscription. The UE 120 may answer the call request on the first subscription to establish a call, and may place the call on the second subscription on hold.

As shown by reference number 510, the UE 120 may transmit an inter-RAT (shown as iRAT) measurement report to the network using the NR RAT and the second subscription. The inter-RAT measurement report may indicate that an LTE cell (e.g., a cell using the LTE RAT) has better conditions than the NR cell (e.g., a cell using the NR RAT) on which the UE 120 is currently camped using the second subscription. As a result, the network may trigger handover from the NR cell to the LTE cell, as shown by reference number 515. As shown by reference number 520, the network may transmit a packet switched handover (PSHO) command to the UE 120 to initiate handover of the UE 120 from NR to LTE for the second subscription. As shown by reference number 525, the UE 120 may undergo handover of the second subscription from NR to LTE.

However, if the UE 120 does not support NR+LTE DSDA, then the UE 120 may transition from the NR+NR DSDA mode to an NR+LTE DSDS mode. As a result, the second subscription becomes OOS, and the UE 120 cannot communicate with the network using the second subscription. As a result, the UE 120 drops the call that was on hold using the second subscription, as shown by reference number 530. Some techniques and apparatuses described herein address these and other issues, thereby improving a user experience and reducing a number of dropped calls.

As indicated above, FIG. 5 is provided as an example. Other examples may differ from what is described with regard to FIG. 5.

Figure 6:
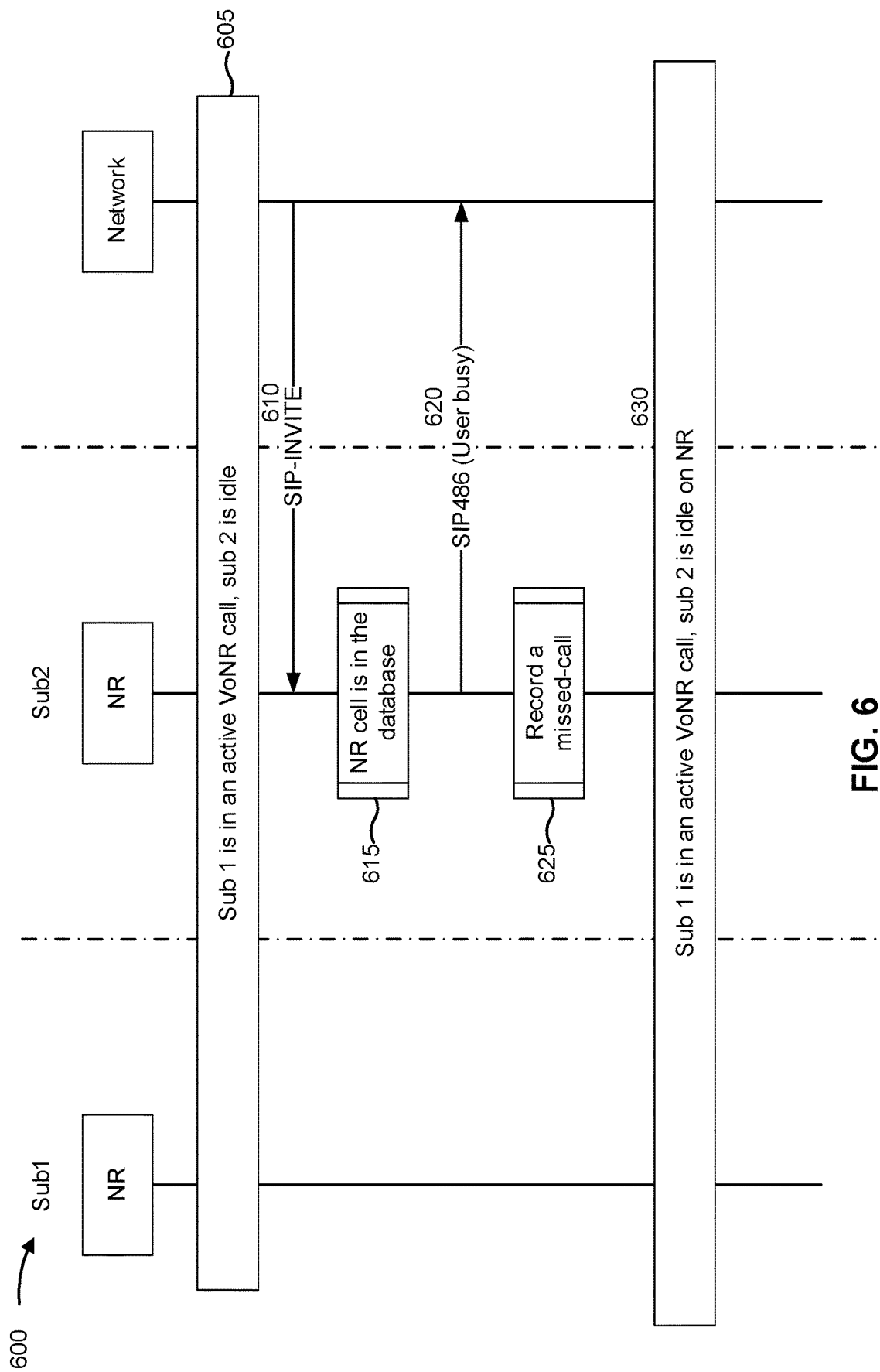
FIGS. 6-11 are diagrams illustrating examples of handling calls associated with user equipment transition from dual active mode to dual standby mode, in accordance with the present disclosure.

FIG. 6 is a diagram illustrating an example 600 of handling calls associated with UE transition from dual active mode to dual standby mode, in accordance with the present disclosure. As shown in FIG. 6, a UE 120 may have a first subscription (shown as Sub1) and a second subscription (shown as Sub2). The UE 120 may use NR for both the first subscription and the second subscription. As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 605, the UE 120 may be in an active session using an NR RAT (e.g., a first RAT) and the first subscription of the UE 120. The UE 120 may also be in an idle session using the NR RAT and the second subscription of the UE 120. If the UE 120 supports NR+NR DSDA, then the UE 120 may operate using the DSDA mode because both subscriptions are using NR, in this example. In some aspects, the active session on the first subscription may be a call (e.g., a voice call, a video call, and/or a VoNR call) or another type of session, such as an online gaming session, a stock trading session, an OTT session, a video call session, or the like. In some aspects, the active session may be delay sensitive or latency sensitive (e.g., due to a quality of service requirement). In some aspects, the UE 120 may be in an RRC connected mode for the active session on the first subscription. In some aspects, the UE 120 may be in an IMS idle mode for the idle session on the second subscription (and may be in an RRC idle mode or an RRC connected mode).

As shown by reference number 610, the UE 120 may receive a call request using the NR RAT and the second subscription. In example 600, the call request is transmitted via a SIP INVITE message. In some aspects, the call request is a request for a call, such as a voice call, a video call, or a VoNR call. The UE 120 may receive the call request while the UE 120 is in the active session using the NR RAT and the first subscription.

As shown by reference number 615, the UE 120 may determine that the call request is received from a serving cell of the NR RAT (e.g., an NR cell) that is associated with fallback from the NR RAT to an LTE RAT (e.g., a second RAT) for calls (e.g., voice calls or video calls). For example, the UE 120 may store a database that includes information indicating whether one or more NR cells are associated with fallback from the NR RAT to the LTE RAT for calls (e.g., whether the one or more NR cells are associated with EPS FB to LTE), which is sometimes referred to herein as "EPS fallback." The UE 120 may search the database to determine whether an NR serving cell for the second subscription is associated with EPS fallback.

The database may store information that identifies a first set of NR cells that are associated with EPS fallback, and/or the database may store information that identifies a second set of NR cells that are not associated with EPS fallback. In some aspects, the UE 120 may update the database based at least in part on historical information associated with the UE 120. For example, if the UE 120 determines that an NR cell triggers EPS fallback (e.g., based at least in part on receiving an EPS FB command on the NR cell), then the UE 120 may add a cell identifier of the NR cell to the database and/or may add or modify a flag associated with the cell identifier to indicate that the NR cell triggers EPS fallback. Additionally, or alternatively, if the UE 120 determines that an NR cell does not trigger EPS fallback, then the UE 120 may remove a cell identifier of the NR cell from the database and/or may update a flag associated with the cell identifier to indicate that the NR cell does not trigger EPS fallback. Additionally, or alternatively, the UE 120 and one or more other UEs 120 may provide such information regarding NR cells to a central device (e.g., in the network), and the central device may transmit periodic updates to the UE 120 to update a local database stored by the UE 120. Additionally, or alternatively, the UE 120 may transmit a cell identifier of an NR cell to the central device, and the central device may respond with an indication of whether the NR cell is associated with EPS fallback.

As shown, when the UE 120 receives a call request on an NR cell associated with the second subscription (and when the UE 120 is on an active NR session on the first subscription), the UE 120 may search the database to determine whether the NR cell is in the database and/or is flagged in the database as being associated with EPS fallback. As a result, the UE 120 can determine whether the NR cell is associated with EPS fallback.

As shown by reference number 620, the UE 120 may reject the call request, using the NR RAT and the second subscription, based at least in part on determining that the call request is received via an NR cell associated with EPS fallback. In example 600, the UE 120 rejects the call request by transmitting a SIP 486 message (e.g., a SIP Busy Here message) to the network, which is then transmitted by the network to the calling UE to notify a user of the calling UE that the UE 120 is busy. In some aspects, rather than rejecting the call request, the UE 120 may transition the second subscription to a third RAT (other than the NR RAT and the LTE RAT), such as a wireless local area network (WLAN) RAT (e.g., an inter-WLAN RAT) or another type of non-3GPP access RAT. This may enable the UE 120 to accept the call request. Additional details regarding transitioning to the third RAT are described in more detail elsewhere herein.

In some aspects, rather than or in addition to searching the database, the UE 120 may determine whether the UE 120 and/or the second subscription is capable of supporting calls using the first RAT (e.g., is capable of voice or video over NR). If the UE 120 and/or the second subscription is not capable of supporting calls using the first RAT, then the UE 120 may reject the call request or may transition the second subscription to the third RAT, as described above. In some aspects, the UE 120 may make this determination prior to searching the database, and may refrain from searching the database if the UE 120 and/or the second subscription is not capable of supporting calls using the first RAT, thereby conserving resources of the UE 120 (e.g., memory resources or processing resources).

As shown by reference number 625, if the UE 120 rejects the call, then the UE 120 may record a missed call. For example, the UE 120 may store information that indicates that a call was missed and/or a phone number (e.g., a mobile telephone number or the like) associated with the missed call, which may be determined from the call request. In some aspects, the UE 120 may output, via one or more output components of the UE 120 (e.g., a speaker, a display, or the like), an indication that the call request was rejected, an indication of a missed call, an indication of a phone number associated with the missed call, or the like.

As shown by reference number 630, because the call request was rejected, rather than the second subscription going out of service (as described above in connection with FIG. 4) due to EPS fallback, the idle session of the second subscription is maintained, thereby improving performance of the UE 120. Furthermore, a caller is notified that the UE 120 is busy, rather than wasting network resources with a ringing call. Although the techniques of FIG. 6 are described in connection with an NR RAT as a first RAT, an LTE RAT as a second RAT, and a WLAN or other non-3GPP access RAT as a third RAT, the techniques may be applied to other combinations of RATs.

As indicated above, FIG. 6 is provided as an example. Other examples may differ from what is described with regard to FIG. 6.

Figure 7:
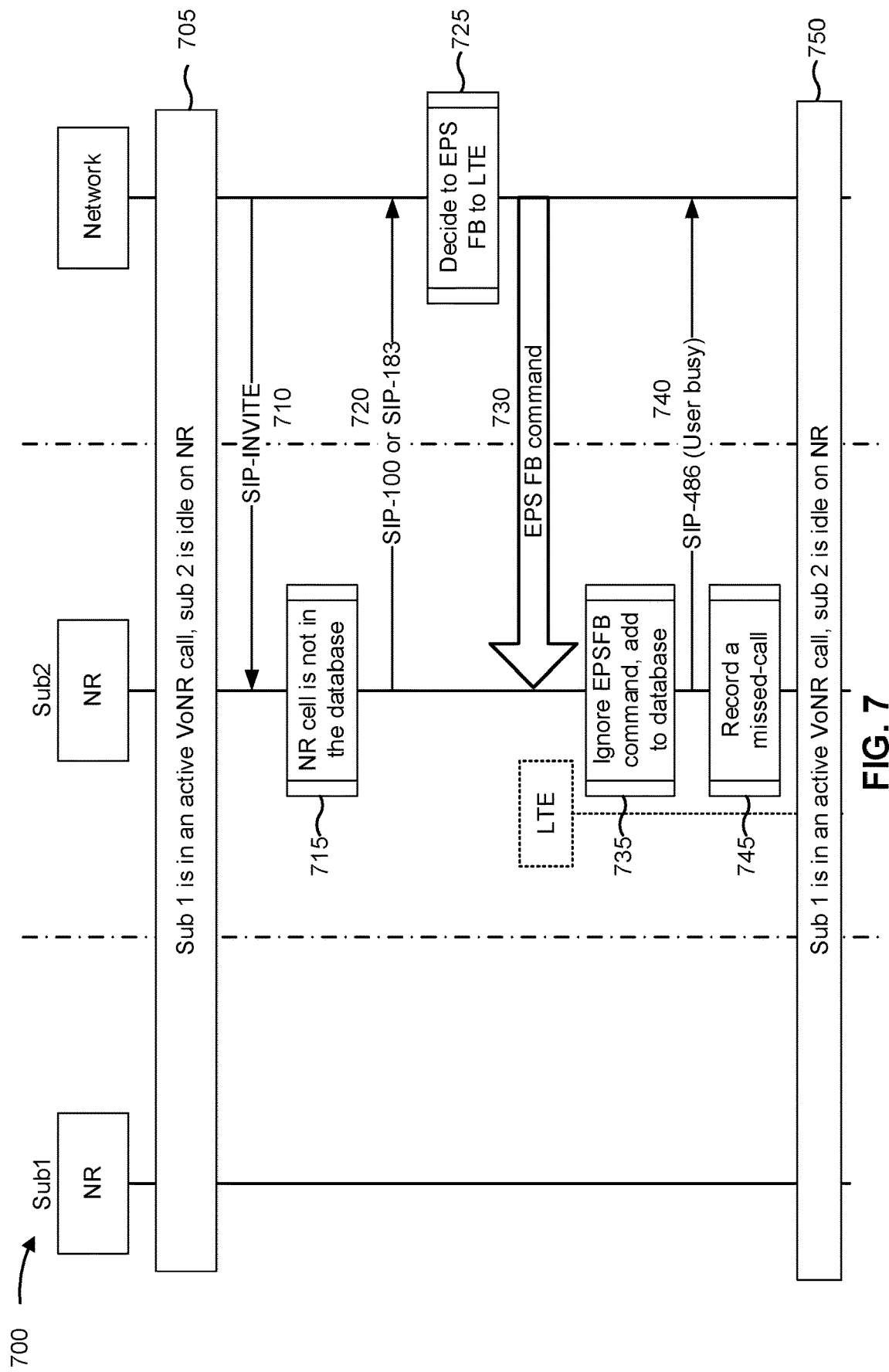

FIG. 7 is a diagram illustrating an example 700 of handling calls associated with UE transition from dual active mode to dual standby mode, in accordance with the present disclosure. As shown in FIG. 7, a UE 120 may have a first subscription (shown as Sub1) and a second subscription (shown as Sub2). The UE 120 may use NR for both the first subscription and the second subscription. As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 705, the UE 120 may be in an active session using an NR RAT (e.g., a first RAT) and the first subscription of the UE 120, and the UE 120 may also be in an idle session using the NR RAT and the second subscription of the UE 120, in a similar manner as described above in connection with reference number 605 of FIG. 6. As shown by reference number 710, the UE 120 may receive a call request using the NR RAT and the second subscription, in a similar manner as described above in connection with reference number 610 of FIG. 6.

As shown by reference number 715, the database described above in connection with FIG. 6 may not store an indication that the NR cell, via which the call request is received, is associated with EPS fallback. Based at least in part on determining that such an indication is not stored in the database, the UE 120 may transmit a response to the call request using the NR RAT and the second subscription, as shown by reference number 720. In example 700, the response is transmitted via a SIP 100 message (e.g., a SIP Trying message) or a SIP 183 message (e.g., a SIP Session Progress message).

As shown by reference number 725, the network may trigger fallback from the NR RAT to an LTE RAT (e.g., EPS fallback). For example, the network may not be capable of supporting VoNR, and thus may trigger fallback to LTE to attempt to set up the call using VoLTE. As shown by reference number 730, the network may transmit a fallback command (e.g., an EPS FB command) to the UE 120 using the NR RAT and the second subscription.

Based at least in part on receiving the fallback command, the UE 120 may determine that the call request is received from a serving cell of the NR RAT (e.g., an NR cell) that is associated with fallback from the NR RAT to an LTE RAT (e.g., a second RAT) for calls (e.g., voice calls or video calls). Thus, the UE 120 may determine that the call request is received from a serving cell of the NR RAT that is associated with EPS fallback based at least in part on searching a database (as described above in connection with FIG. 6) and/or based at least in part on receiving an EPS FB command.

As shown by reference number 735, the UE 120 may ignore the EPS FB command. Thus, the UE 120 may refrain from falling back from the NR RAT to the LTE RAT for the second subscription. In some aspects, based at least in part on receiving the EPS FB command, the UE 120 may add a cell identifier of the NR cell to the database and/or may add or modify a flag associated with the cell identifier to indicate that the NR cell triggers EPS fallback.

As shown by reference number 740, the UE 120 may reject the call request, using the NR RAT and the second subscription, based at least in part on determining that the call request is received via an NR cell associated with EPS fallback (e.g., based at least in part on receiving the EPS FB command). In example 700, the UE 120 rejects the call request by transmitting a SIP 486 message (e.g., a SIP Busy Here message) to the network, which is then transmitted by the network to the calling UE to notify a user of the calling UE that the UE 120 is busy. In some aspects, rather than rejecting the call request, the UE 120 may transition the second subscription to a third RAT, such as a WLAN RAT (e.g., an inter-WLAN RAT) or another type of non-3GPP access RAT, as described elsewhere herein.

As shown by reference number 745, if the UE 120 rejects the call, then the UE 120 may record a missed call, as described above in connection with FIG. 6. As shown by reference number 750, because the call request was rejected, rather than the second subscription going out of service (as described above in connection with FIG. 4) due to EPS fallback, the idle session of the second subscription is maintained, thereby improving performance of the UE 120. Furthermore, a caller is notified that the UE 120 is busy, rather than wasting network resources with a ringing call. Although the techniques of FIG. 7 are described in connection with an NR RAT as a first RAT, an LTE RAT as a second RAT, and a WLAN or other non-3GPP access RAT as a third RAT, the techniques may be applied to other combinations of RATs.

As indicated above, FIG. 7 is provided as an example. Other examples may differ from what is described with regard to FIG. 7.

Figure 8:
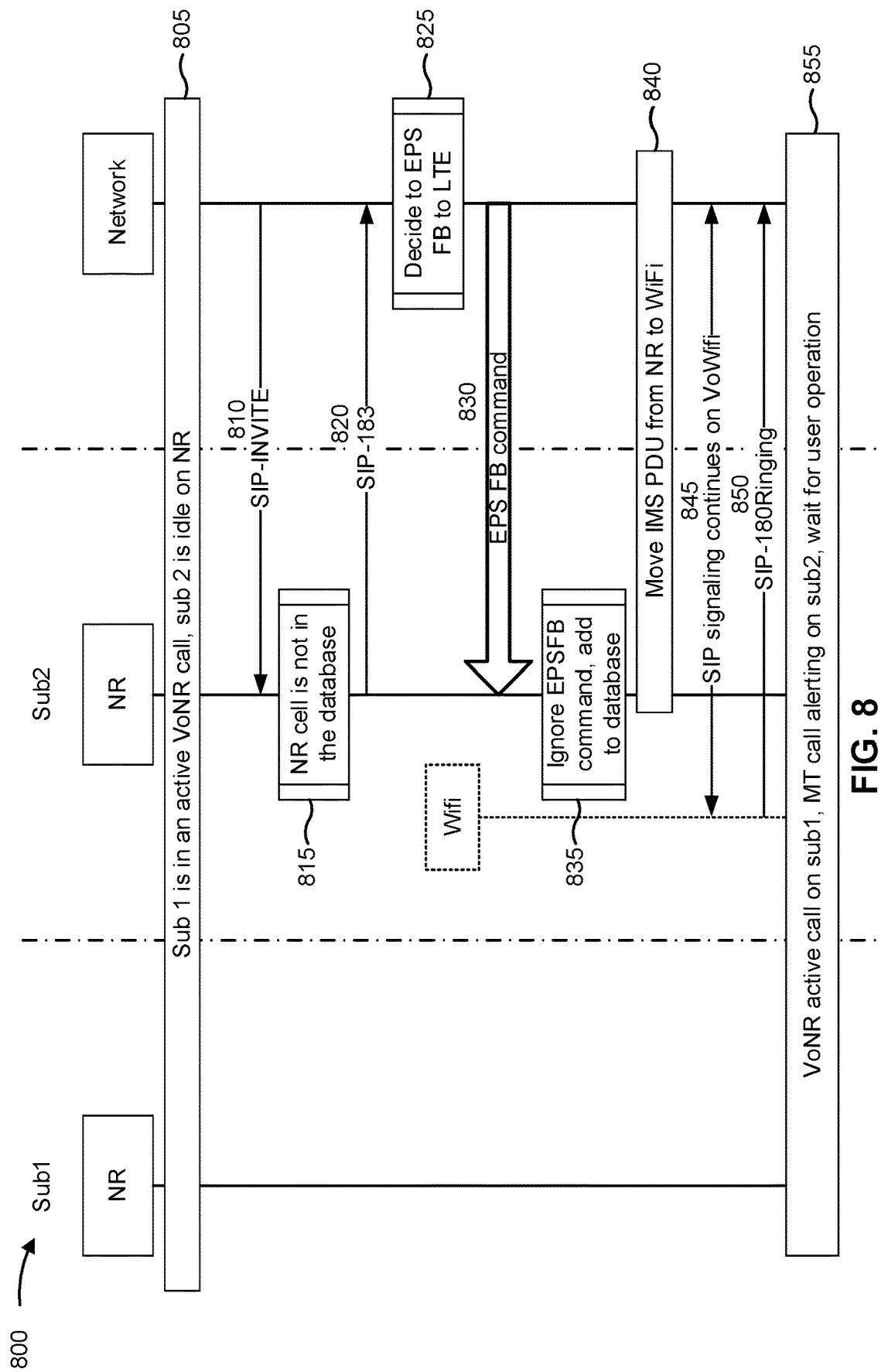

FIG. 8 is a diagram illustrating an example 800 of handling calls associated with UE transition from dual active mode to dual standby mode, in accordance with the present disclosure. As shown in FIG. 8, a UE 120 may have a first subscription (shown as Sub1) and a second subscription (shown as Sub2). The UE 120 may use NR for both the first subscription and the second subscription. As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 805, the UE 120 may be in an active session using an NR RAT (e.g., a first RAT) and the first subscription of the UE 120, and the UE 120 may also be in an idle session using the NR RAT and the second subscription of the UE 120, in a similar manner as described above in connection with reference number 605 of FIG. 6. As shown by reference number 810, the UE 120 may receive a call request using the NR RAT and the second subscription, in a similar manner as described above in connection with reference number 610 of FIG. 6.

As shown by reference number 815, the database described above in connection with FIG. 6 may not store an indication that the NR cell, via which the call request is received, is associated with EPS fallback. Based at least in part on determining that such an indication is not stored in the database, the UE 120 may transmit a response to the call request using the NR RAT and the second subscription, as shown by reference number 820. In example 800, the response is transmitted via a SIP 183 message (e.g., a SIP Session Progress message).

As shown by reference number 825, the network may trigger fallback from the NR RAT to an LTE RAT (e.g., EPS fallback), in a similar manner as described elsewhere herein. As shown by reference number 830, the network may transmit a fallback command (e.g., an EPS FB command) to the UE 120 using the NR RAT and the second subscription.

Based at least in part on receiving the fallback command, the UE 120 may determine that the call request is received from a serving cell of the NR RAT (e.g., an NR cell) that is associated with fallback from the NR RAT to an LTE RAT (e.g., a second RAT) for calls (e.g., voice calls or video calls). Thus, the UE 120 may determine that the call request is received from a serving cell of the NR RAT that is associated with EPS fallback based at least in part on searching a database (as described above in connection with FIG. 6) and/or based at least in part on receiving an EPS FB command.

As shown by reference number 835, the UE 120 may ignore the EPS FB command. Thus, the UE 120 may refrain from falling back from the NR RAT to the LTE RAT for the second subscription. In some aspects, based at least in part on receiving the EPS FB command, the UE 120 may add a cell identifier of the NR cell to the database and/or may add or modify a flag associated with the cell identifier to indicate that the NR cell triggers EPS fallback.

As shown by reference number 840, the UE 120 may transition the second subscription to a third RAT, such as a WLAN RAT (e.g., an inter-WLAN RAT) or another type of non-3GPP access RAT, as described elsewhere herein. In example 800, the third RAT is shown as a Wi-Fi RAT. In some aspects, the second subscription may be transitioned from the NR RAT to the third RAT by transitioning an IMS PDU session from the NR RAT to the third RAT, as shown. In some aspects, the UE 120 may determine whether the third RAT is available for communications of the UE 120 (e.g., whether the UE 120 is connected to a WLAN network, such as a Wi-Fi network, or a Wi-Fi access point). If the third RAT is available for the UE 120, then the UE 120 may transition the second subscription to the third RAT. If the third RAT is not available for the UE 120, then the UE 120 may reject the call request in a similar manner as described elsewhere herein.

As shown by reference number 845, after the second subscription is transitioned to the third RAT, SIP signaling for the call request may continue (e.g., from the response, such as the SIP 183 message) between the UE 120 and the calling UE via the network. For example, the UE 120 may transmit, via the third RAT and in association with the second subscription, a SIP ringing message (e.g., SIP 180 Ringing) to the calling UE via the network, as shown by reference number 850.

As shown by reference number 855, the UE 120 may alert a user of the call on the second subscription, such as by output, via one or more output components of the UE 120 (e.g., a speaker, a display, or the like), a notification of the call request. A user of the UE 120 may provide input to accept or reject the call request. If the call request is accepted, then the call on the first subscription may be placed on hold and the call on the second subscription may be answered. If the call request is rejected, then the idle session of the second subscription is maintained rather than the second subscription going out of service (as described above in connection with FIG. 4), thereby improving performance of the UE 120. Furthermore, a caller is notified that the UE 120 is busy, rather than wasting network resources with a ringing call. Although the techniques of FIG. 8 are described in connection with an NR RAT as a first RAT, an LTE RAT as a second RAT, and a WLAN or other non-3GPP access RAT as a third RAT, the techniques may be applied to other combinations of RATs.

As indicated above, FIG. 8 is provided as an example. Other examples may differ from what is described with regard to FIG. 8.

Figure 9:
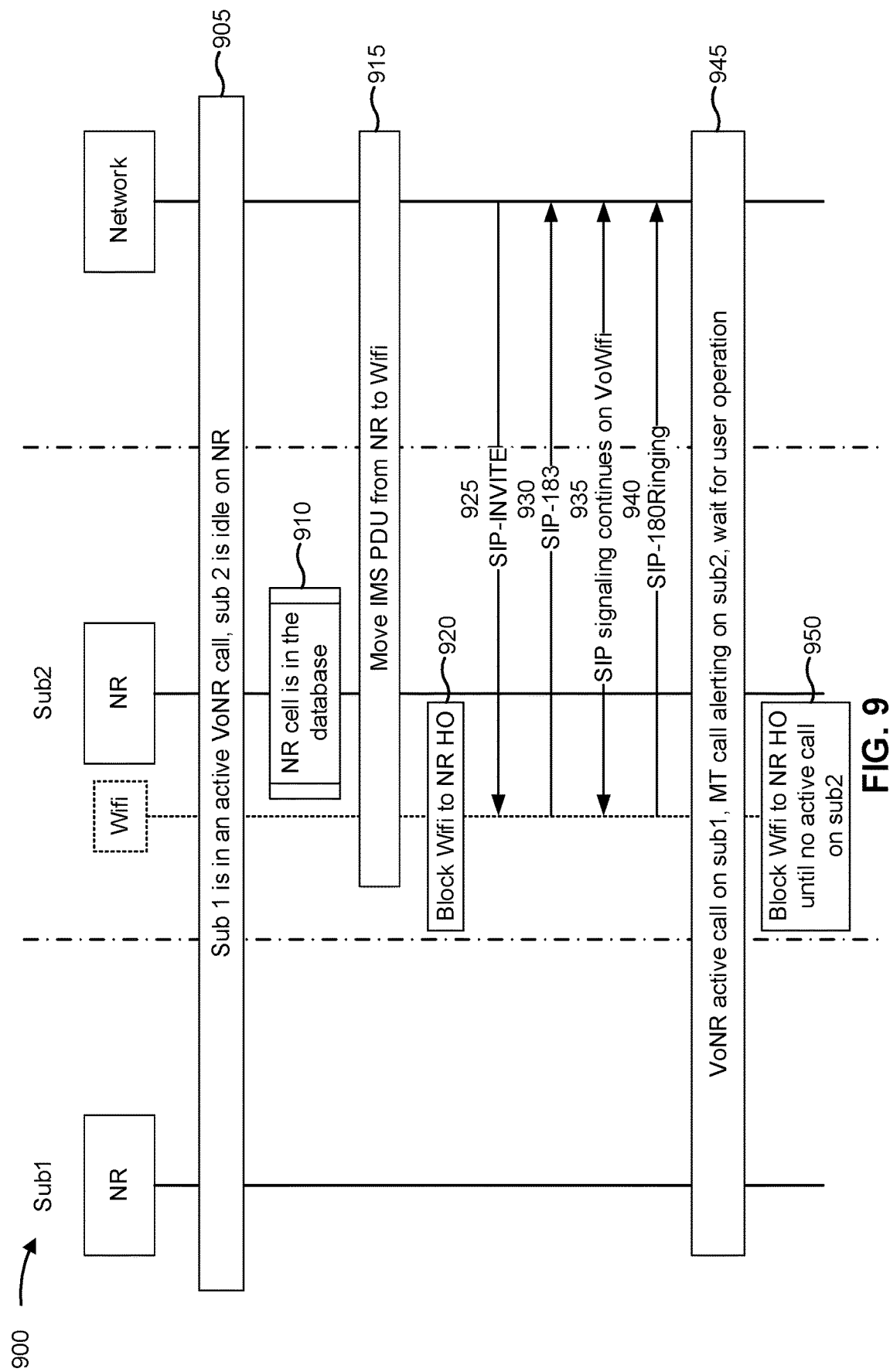

FIG. 9 is a diagram illustrating an example 900 of handling calls associated with UE transition from dual active mode to dual standby mode, in accordance with the present disclosure. As shown in FIG. 9, a UE 120 may have a first subscription (shown as Sub1) and a second subscription (shown as Sub2). The UE 120 may use NR for both the first subscription and the second subscription. As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 905, the UE 120 may be in an active session using an NR RAT (e.g., a first RAT) and the first subscription of the UE 120, and the UE 120 may also be in an idle session using the NR RAT and the second subscription of the UE 120, in a similar manner as described above in connection with reference number 605 of FIG. 6.

As shown by reference number 910, the UE 120 may determine that the serving cell of the NR RAT (e.g., an NR cell) for the second subscription is associated with fallback from the NR RAT to an LTE RAT (e.g., a second RAT) for calls (e.g., voice calls or video calls). For example, the UE 120 may make this determination based at least in part on searching for a cell identifier of the serving cell in a database, as described in more detail above in connection with reference number 615 of FIG. 6. In some aspects, the UE 120 may make this determination while the UE 120 is in the active session and the idle session described above.

As shown by reference number 915, the UE 120 may transition the second subscription to a third RAT, such as a WLAN RAT (e.g., an inter-WLAN RAT) or another type of non-3GPP access RAT, as described elsewhere herein. For example, the UE 120 may transition the second subscription to the third RAT based at least in part on determining, while the UE 120 is in the active session and the idle session described above, that the serving cell is associated with fallback from the first RAT to the second RAT for calls. In example 900, the third RAT is shown as a Wi-Fi RAT. In some aspects, the second subscription may be transitioned from the NR RAT to the third RAT by transitioning an IMS PDU session from the NR RAT to the third RAT, as shown. In some aspects, the UE 120 may determine whether the third RAT is available for communications of the UE 120 (e.g., whether the UE 120 is connected to a WLAN network, such as a Wi-Fi network, or a Wi-Fi access point). If the third RAT is available for the UE 120, then the UE 120 may transition the second subscription to the third RAT. If the third RAT is not available for the UE 120, then the UE 120 may reject the call request in a similar manner as described elsewhere herein. Notably, the UE 120 may transition the second subscription to the third RAT prior to receiving an EPS FB command, which may reduce delays in call setup.

As shown by reference number 920, the UE 120 may block handover, associated with the second subscription, from the third RAT to the NR RAT until the active session on the first subscription is terminated. In this way, the UE 120 may prevent subsequent EPS fallback.

As shown by reference number 925, the UE 120 may receive a call request using the third RAT and the second subscription. For example, because the IMS PDU associated with the second subscription has been transitioned from the NR RAT to the third RAT, the UE 120 may receive the call request via the third RAT, rather than the NR RAT. As shown by reference number 930, the UE 120 may transmit a response to the call request using the third RAT and the second subscription. In example 900, the response is transmitted via a SIP 183 message (e.g., a SIP Session Progress message).

As shown by reference number 935, SIP signaling for the call request may continue (e.g., from the response, such as the SIP 183 message) between the UE 120 and the calling UE via the network, such as by using voice over Wi-Fi (VoWiFi). For example, the UE 120 may transmit, via the third RAT and in association with the second subscription, a SIP ringing message (e.g., SIP 180 Ringing) to the calling UE via the network, as shown by reference number 940.

As shown by reference number 945, the UE 120 may alert a user of the call on the second subscription, such as by output, via one or more output components of the UE 120 (e.g., a speaker, a display, or the like), a notification of the call request. A user of the UE 120 may provide input to accept or reject the call request. If the call request is accepted, then the call on the first subscription may be placed on hold and the call on the second subscription may be answered. If the call request is rejected, then the idle session of the second subscription is maintained rather than the second subscription going out of service (as described above in connection with FIG. 4), thereby improving performance of the UE 120. Furthermore, a caller is notified that the UE 120 is busy, rather than wasting network resources with a ringing call.

As shown by reference number 950, the UE 120 may block handover, associated with the second subscription, from the third RAT to the NR RAT until the call session on the second subscription is terminated (e.g., if the user answers the call on the second subscription and later hangs up, or if the user rejects the call on the second subscription) and/or until the active session on the first subscription is terminated. In this way, the UE 120 may prevent subsequent EPS fallback.

Although the techniques of FIG. 9 are described in connection with an NR RAT as a first RAT, an LTE RAT as a second RAT, and a WLAN or other non-3GPP access RAT as a third RAT, the techniques may be applied to other combinations of RATs.

As indicated above, FIG. 9 is provided as an example. Other examples may differ from what is described with regard to FIG. 9.

Figure 10:
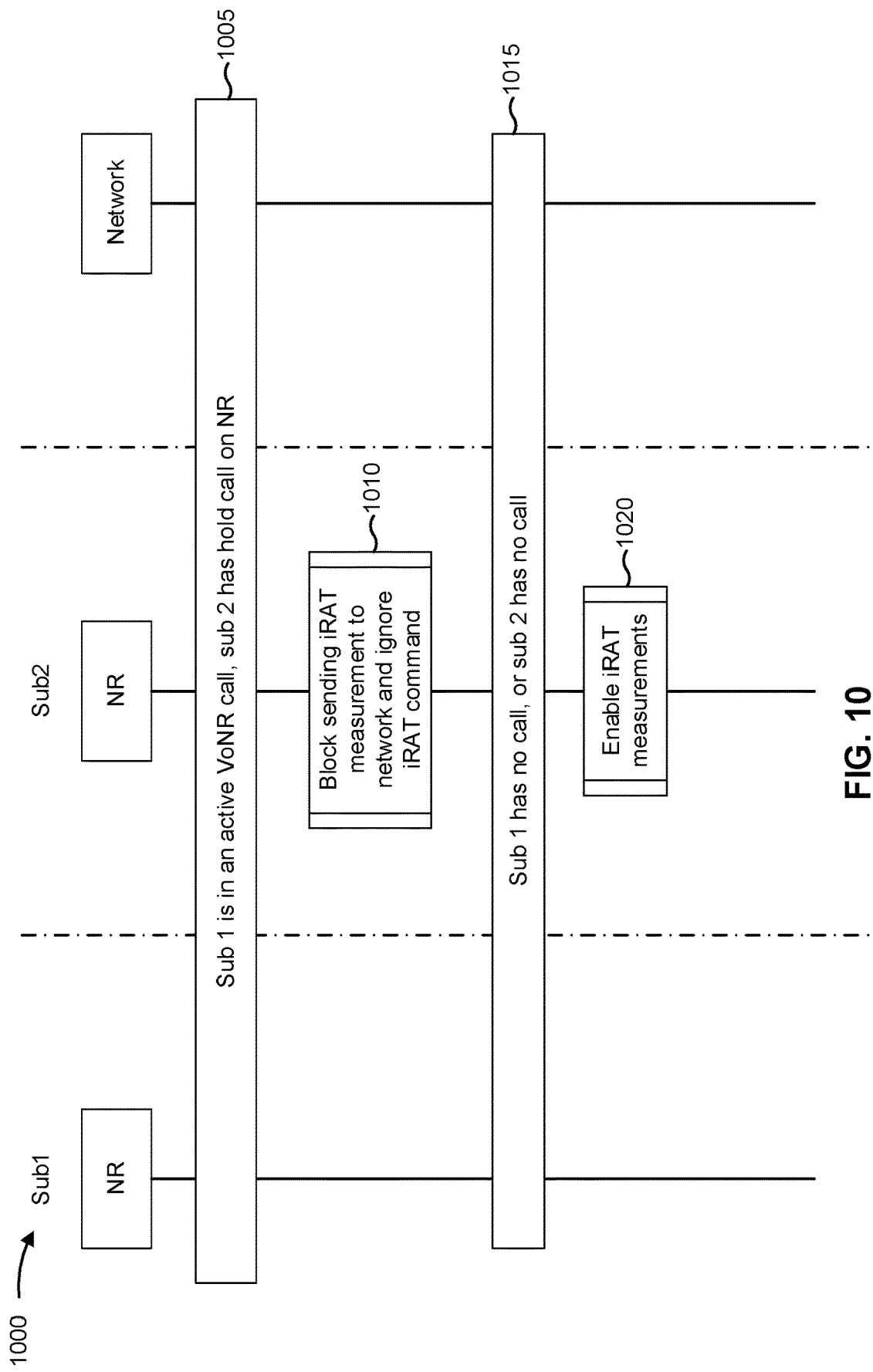

FIG. 10 is a diagram illustrating an example 1000 of handling calls associated with UE transition from dual active mode to dual standby mode, in accordance with the present disclosure. As shown in FIG. 10, a UE 120 may have a first subscription (shown as Sub1) and a second subscription (shown as Sub2). The UE 120 may use NR for both the first subscription and the second subscription. As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 1005, the UE 120 may be in an active session using an NR RAT (e.g., a first RAT) and the first subscription of the UE 120 (as described elsewhere herein), and the UE 120 may also be in a held session using the NR RAT and the second subscription of the UE 120. In some aspects, the held session may be a call (e.g., a voice call, a video call, a VoNR call, or the like) that is on hold. For example, the UE 120 may receive a call request on the second subscription and may answer the call request to establish a call with another device. While the call is in progress, the UE 120 may receive a call request on the first subscription. The UE 120 may answer the call request on the first subscription to establish a call, and may place the call on the second subscription on hold.

As shown by reference number 1010, based at least in part on determining that the second subscription is associated with a call on hold using the NR RAT while the UE 120 is in the active session using the NR RAT associated with the first subscription, the UE 120 may block (e.g., may disable) transmission of an inter-RAT (shown as iRAT) measurement report. An inter-RAT measurement report may be associated with the NR RAT and an LTE RAT. For example, an inter-RAT measurement report may include LTE measurements, NR2LTE measurements, or the like. In some aspects, the UE 120 may receive an inter-RAT measurement control command that instructs the UE 120 to transmit an inter-RAT measurement report. However, the UE 120 may ignore the inter-RAT measurement control command based at least in part on determining that the second subscription is associated with a call on hold using the NR RAT while the UE 120 is in the active session using the NR RAT associated with the first subscription.

As shown by reference number 1015, the UE 120 may determine that at least one of the active session of the first subscription or the held session of the second subscription has been terminated. For example, a call on the first subscription may be terminated, and/or a call on the second subscription may be terminated. Based at least in part on this determination, the UE 120 may unblock (e.g., may enable) transmission of inter-RAT measurement reports, as shown by reference number 1020. Thus, after termination of at least one of the calls on the first subscription or the second subscription, the UE 120 may transmit an inter-RAT measurement report upon receiving an inter-RAT measurement control command.

Although the techniques of FIG. 10 are described in connection with an NR RAT as a first RAT and an LTE RAT as a second RAT, the techniques may be applied to other combinations of RATs.

As indicated above, FIG. 10 is provided as an example. Other examples may differ from what is described with regard to FIG. 10.

Figure 11:
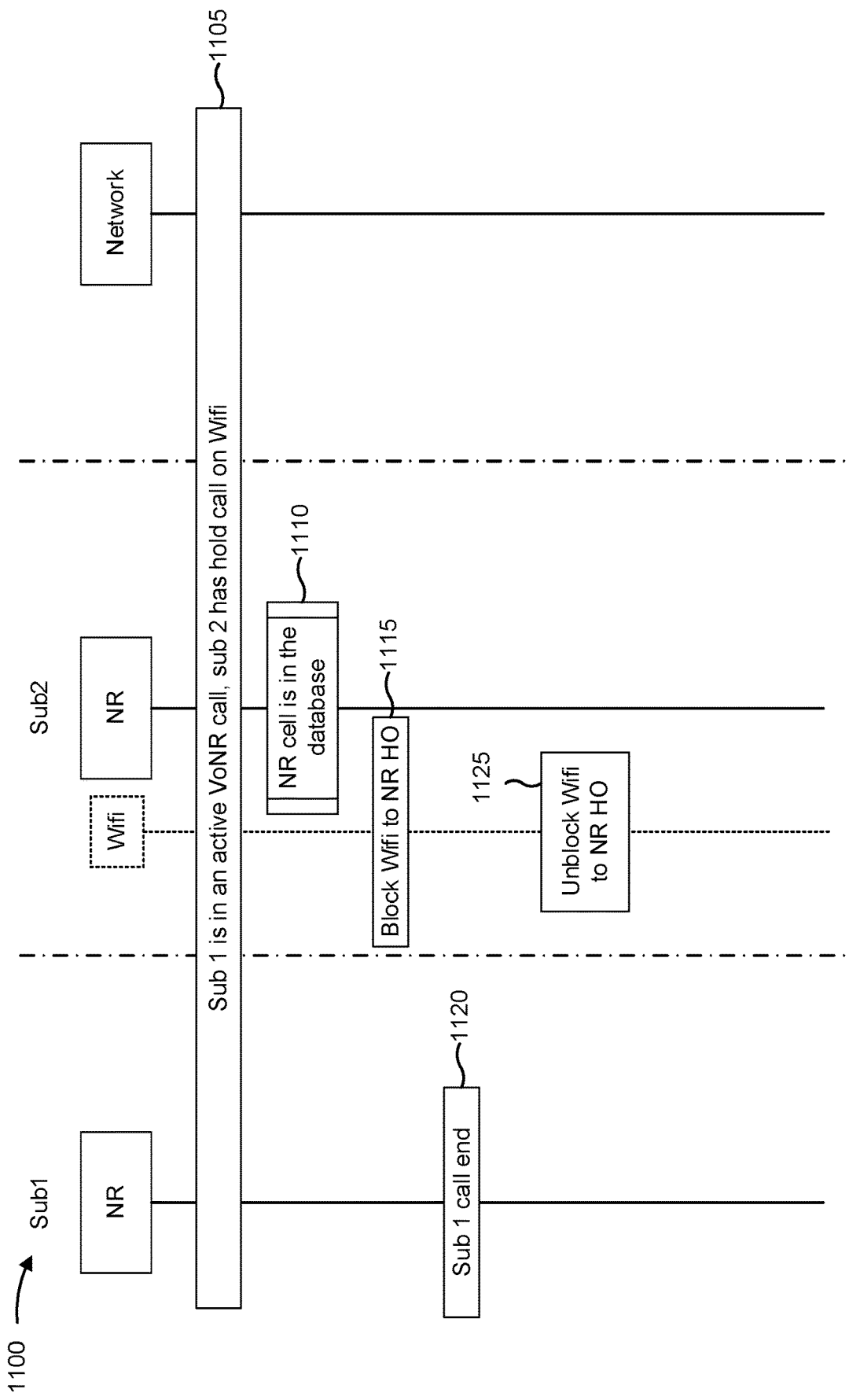

FIG. 11 is a diagram illustrating an example 1100 of handling calls associated with UE transition from dual active mode to dual standby mode, in accordance with the present disclosure. As shown in FIG. 11, a UE 120 may have a first subscription (shown as Sub1) and a second subscription (shown as Sub2). The UE 120 may use NR for both the first subscription and the second subscription. As also shown, the UE 120 may communicate with a network. The network may include a core network (and the UE 120 may communicate with one or more devices of the core network, such as network controller 130) and/or a radio access network (and the UE 120 may communicate with a base station 110 of the radio access network).

As shown by reference number 1105, the UE 120 may be in an active session using an NR RAT (e.g., a first RAT) and the first subscription of the UE 120 (as described elsewhere herein), and the UE 120 may also be in a held session using a third RAT (shown as a Wi-Fi RAT) and the second subscription of the UE 120. In some aspects, the held session may be a call (e.g., a voice call, a video call, a VoWiFi call, or the like) that is on hold. For example, the UE 120 may receive a call request on the second subscription and may answer the call request to establish a call with another device. While the call is in progress, the UE 120 may receive a call request on the first subscription. The UE 120 may answer the call request on the first subscription to establish a call, and may place the call on the second subscription on hold.

As shown by reference number 1110, the UE 120 may determine that the serving cell of the NR RAT (e.g., an NR cell) for the second subscription is associated with fallback from the NR RAT to an LTE RAT (e.g., a second RAT) for calls (e.g., voice calls or video calls). For example, the UE 120 may make this determination based at least in part on searching for a cell identifier of the serving cell in a database, as described in more detail above in connection with reference number 615 of FIG. 6. In some aspects, the UE 120 may make this determination while the UE 120 is in the active session and the held session described above.

As shown by reference number 1115, based at least in part on determining, while in the active session and the held session, that the second subscription is on an NR serving cell associated with EPS fallback, the UE 120 may block (e.g., disable) handover from the third RAT to the NR RAT (shown as Wi-Fi to NR handover) for the second subscription. In this way, the UE 120 may prevent future EPS fallback that may occur if the second subscription is handed over from the third RAT to the NR RAT.

As shown by reference number 1120, the UE 120 may determine that the active session of the first subscription has been terminated. Additionally, or alternatively, the UE 120 may determine that the held session of the second subscription is terminated. For example, a call on the first subscription may be terminated, and/or a call on the second subscription may be terminated. Based at least in part on determining that the active session and/or the held session has been terminated, the UE 120 may unblock (e.g., may enable) handover from the third RAT to the NR RAT, as shown by reference number 1125.

Although the techniques of FIG. 11 are described in connection with an NR RAT as a first RAT, an LTE RAT as a second RAT, and a Wi-Fi RAT as the third RAT, the techniques may be applied to other combinations of RATs.

As indicated above, FIG. 11 is provided as an example. Other examples may differ from what is described with regard to FIG. 11.

Figure 12:
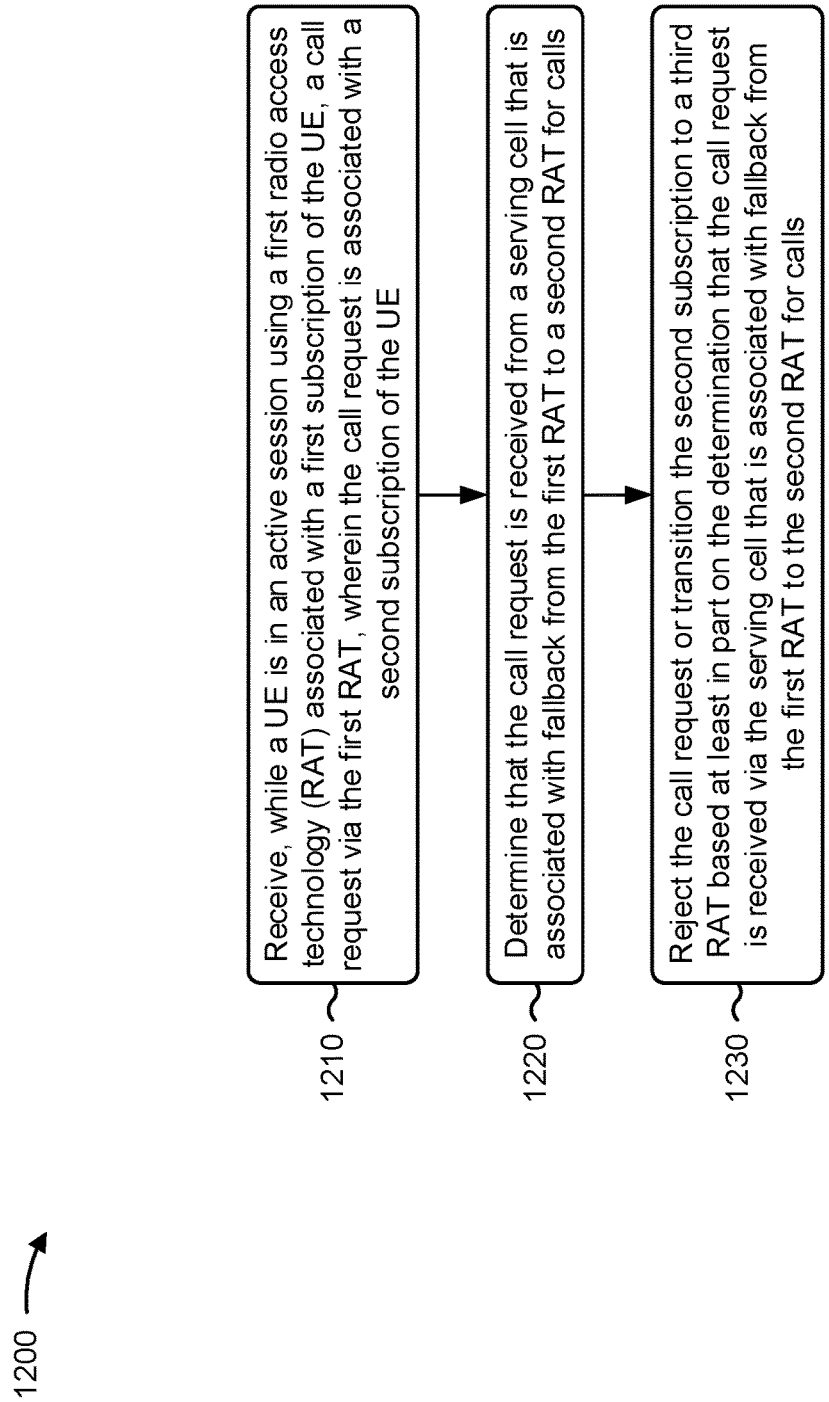
FIGS. 12-15 are diagrams illustrating example processes for handling calls associated with user equipment transition from dual active mode to dual standby mode, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with techniques for handling calls associated with UE transition from dual active mode to dual standby mode.

As shown in FIG. 12, in some aspects, process 1200 may include receiving, while the UE is in an active session using a first RAT associated with a first subscription of the UE, a call request via the first RAT, wherein the call request is associated with a second subscription of the UE (block 1210). For example, the UE (e.g., using reception component 1602, depicted in FIG. 16) may receive, while the UE is in an active session using a first RAT associated with a first subscription of the UE, a call request via the first RAT, wherein the call request is associated with a second subscription of the UE, as described above.

As further shown in FIG. 12, in some aspects, process 1200 may include determining that the call request is received from a serving cell that is associated with fallback from the first RAT to a second RAT for calls (block 1220). For example, the UE (e.g., using determination component 1608, depicted in FIG. 16) may determine that the call request is received from a serving cell that is associated with fallback from the first RAT to a second RAT for calls, as described above.

As further shown in FIG. 12, in some aspects, process 1200 may include rejecting the call request or transitioning the second subscription to a third RAT based at least in part on the determination that the call request is received via the serving cell that is associated with fallback from the first RAT to the second RAT for calls (block 1230). For example, the UE (e.g., using call rejection component 1610 and/or transition component 1624, depicted in FIG. 16) may reject the call request or transition the second subscription to a third RAT based at least in part on the determination that the call request is received via the serving cell that is associated with fallback from the first RAT to the second RAT for calls, as described above.

Process 1200 may include additional aspects, such as any single aspect or any combination of aspects described below and/or in connection with one or more other processes described elsewhere herein.

In a first aspect, process 1200 includes searching a database that stores information indicating whether one or more cells of the first RAT are associated with fallback from the first RAT to the second RAT for calls, and determining that the call request is received from the serving cell that is associated with fallback from the first RAT to the second RAT for calls based at least in part on searching the database.

In a second aspect, alone or in combination with the first aspect, process 1200 includes storing, in the database, an indication that the serving cell is associated with fallback from the first RAT to the second RAT for calls based at least in part on receiving a command to fall back from the first RAT to the second RAT on the serving cell.

In a third aspect, alone or in combination with one or more of the first and second aspects, process 1200 includes updating the information stored in the database based at least in part on receiving updated information from one or more other devices.

In a fourth aspect, alone or in combination with one or more of the first through third aspects, process 1200 includes transmitting an indication that the serving cell is associated with fallback from the first RAT to the second RAT for calls based at least in part on receiving a command to fall back from the first RAT to the second RAT on the serving cell.

In a fifth aspect, alone or in combination with one or more of the first through fourth aspects, process 1200 includes determining that the UE or the second subscription is not capable of supporting calls using the first RAT, and rejecting the call request or transitioning the second subscription to the third RAT based at least in part on the determination that the UE or the second subscription is not capable of supporting calls using the first RAT.

In a sixth aspect, alone or in combination with one or more of the first through fifth aspects, process 1200 includes receiving, from the serving cell, a command to fall back from the first RAT to the second RAT for the call request, and determining that the call request is received from the serving cell that is associated with fallback from the first RAT to the second RAT for calls based at least in part on receiving the command.

In a seventh aspect, alone or in combination with one or more of the first through sixth aspects, process 1200 includes ignoring the command.

In an eighth aspect, alone or in combination with one or more of the first through seventh aspects, process 1200 includes outputting, via one or more output components of the UE, an indication that the call request was rejected based at least in part on rejecting the call request.

In a ninth aspect, alone or in combination with one or more of the first through eighth aspects, process 1200 includes determining that the third RAT is available for communications of the UE, and rejecting the call request or transitioning the second subscription to the third RAT comprises transitioning the second subscription to the third RAT based at least in part on the determination that the third RAT is available for communications of the UE.

In a tenth aspect, alone or in combination with one or more of the first through ninth aspects, process 1200 includes determining that the third RAT is not available for communications of the UE, and rejecting the call request or transitioning the second subscription to the third RAT comprises rejecting the call request based at least in part on the determination that the third RAT is not available for communications of the UE.

In an eleventh aspect, alone or in combination with one or more of the first through tenth aspects, process 1200 includes recording a missing call based at least in part on rejecting the call request.

In a twelfth aspect, alone or in combination with one or more of the first through eleventh aspects, the first RAT is a New Radio RAT, the second RAT is a Long Term Evolution RAT, and the third RAT is a wireless local area network RAT or a non-third generation partnership project access RAT.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
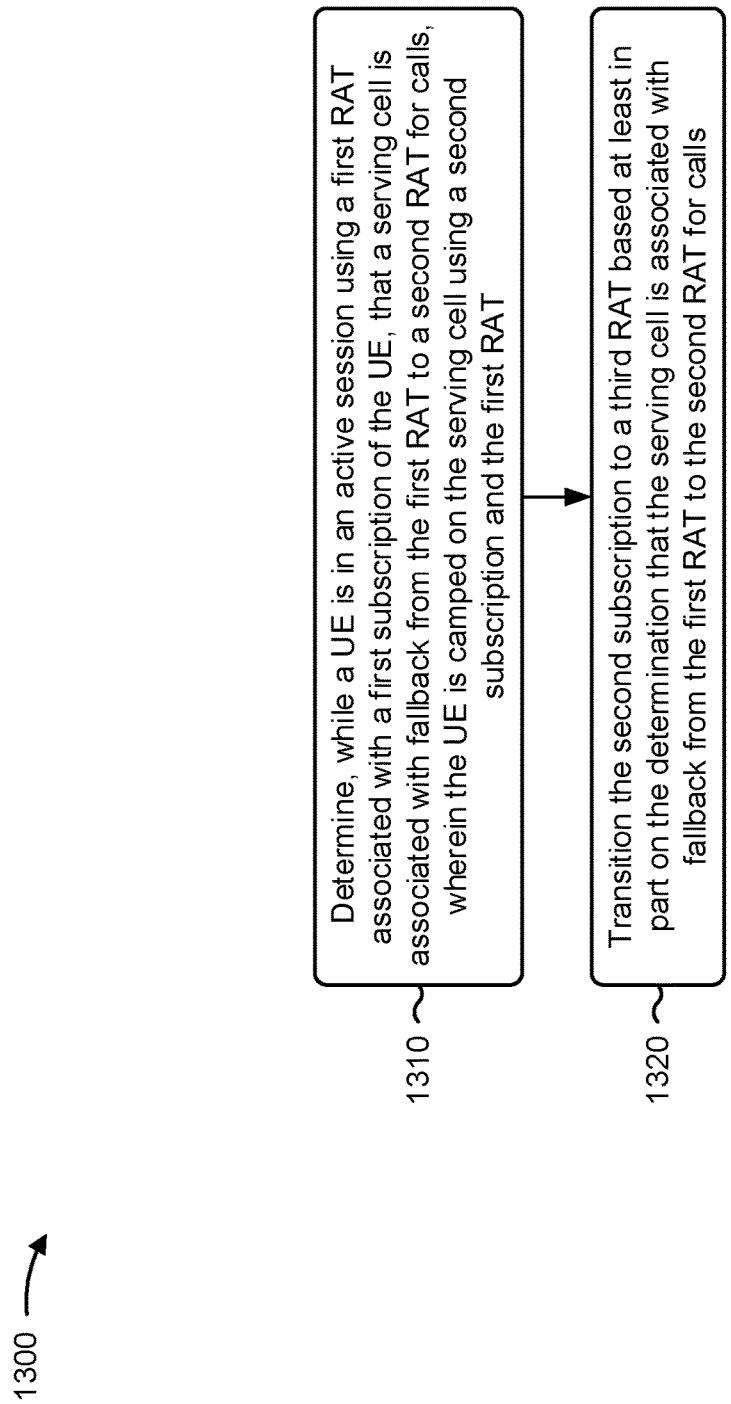

FIG. 13 is a diagram illustrating an example process 1300 performed, for example, by a UE, in accordance with the present disclosure. Example process 1300 is an example where the UE (e.g., UE 120) performs operations associated with techniques for handling calls associated with UE transition from dual active mode to dual standby mode.

As shown in FIG. 13, in some aspects, process 1300 may include determining, while the UE is in an active session using a first RAT associated with a first subscription of the UE, that a serving cell is associated with fallback from the first RAT to a second RAT for calls, wherein the UE is camped on the serving cell using a second subscription and the first RAT (block 1310). For example, the UE (e.g., using determination component 1608, depicted in FIG. 16) may determine, while the UE is in an active session using a first RAT associated with a first subscription of the UE, that a serving cell is associated with fallback from the first RAT to a second RAT for calls, wherein the UE is camped on the serving cell using a second subscription and the first RAT, as described above.

As further shown in FIG. 13, in some aspects, process 1300 may include transitioning the second subscription to a third RAT based at least in part on the determination that the serving cell is associated with fallback from the first RAT to the second RAT for calls (block 1320). For example, the UE (e.g., using transition component 1624, depicted in FIG. 16) may transition the second subscription to a third RAT based at least in part on the determination that the serving cell is associated with fallback from the first RAT to the second RAT for calls, as described above.

Process 1300 may include additional aspects, such as any single aspect or any combination of aspects described below and/or in connection with one or more other processes described elsewhere herein.

In a first aspect, process 1300 includes determining that the third RAT is available for communications of the UE, and transitioning the second subscription to the third RAT based at least in part on the determination that the third RAT is available for communications of the UE.

In a second aspect, alone or in combination with the first aspect, transitioning the second subscription to the third RAT comprises transitioning an IMS PDU session from the first RAT to the third RAT.

In a third aspect, alone or in combination with one or more of the first and second aspects, process 1300 includes blocking handover, associated with the second subscription, from the third RAT to the first RAT until the active session is terminated.

In a fourth aspect, alone or in combination with one or more of the first through third aspects, the first RAT is a New Radio RAT, the second RAT is a Long Term Evolution RAT, and the third RAT is a wireless local area network RAT or a non-third generation partnership project access RAT.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
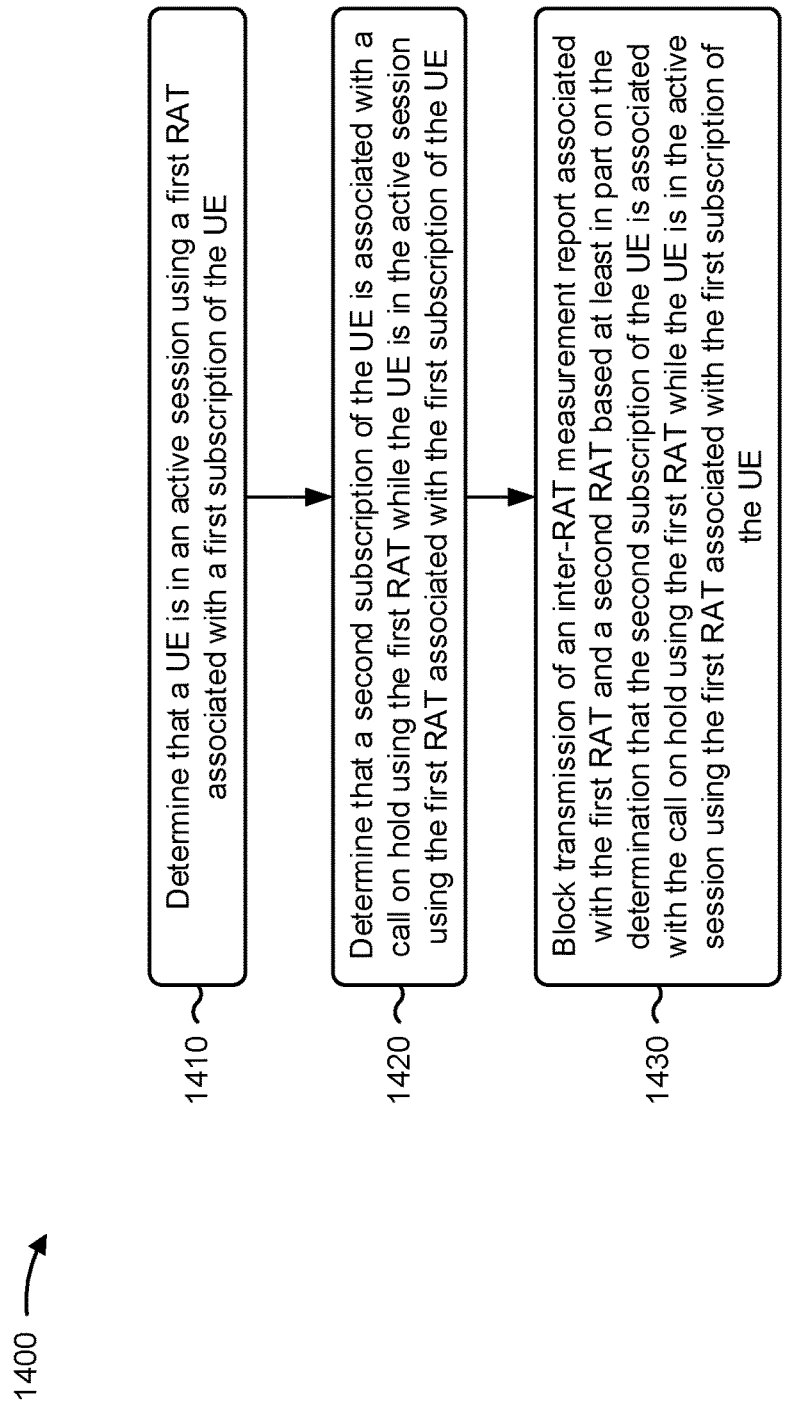

FIG. 14 is a diagram illustrating an example process 1400 performed, for example, by a UE, in accordance with the present disclosure. Example process 1400 is an example where the UE (e.g., UE 120) performs operations associated with techniques for handling calls associated with UE transition from dual active mode to dual standby mode.

As shown in FIG. 14, in some aspects, process 1400 may include determining that the UE is in an active session using a first RAT associated with a first subscription of the UE (block 1410). For example, the UE (e.g., using determination component 1608, depicted in FIG. 16) may determine that the UE is in an active session using a first RAT associated with a first subscription of the UE, as described above.

As further shown in FIG. 14, in some aspects, process 1400 may include determining that a second subscription of the UE is associated with a call on hold using the first RAT while the UE is in the active session using the first RAT associated with the first subscription of the UE (block 1420). For example, the UE (e.g., using determination component 1608, depicted in FIG. 16) may determine that a second subscription of the UE is associated with a call on hold using the first RAT while the UE is in the active session using the first RAT associated with the first subscription of the UE, as described above.

As further shown in FIG. 14, in some aspects, process 1400 may include blocking transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE (block 1430). For example, the UE (e.g., using blocking component 1626, depicted in FIG. 16) may block transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE, as described above.

Process 1400 may include additional aspects, such as any single aspect or any combination of aspects described below and/or in connection with one or more other processes described elsewhere herein.

In a first aspect, process 1400 includes receiving an inter-RAT measurement control command to transmit the inter-RAT measurement report, and ignoring the inter-RAT measurement control command based at least in part on the determination that the second subscription of the UE is associated with the call on hold using the first RAT while the UE is in the active session using the first RAT associated with the first subscription of the UE.

In a second aspect, alone or in combination with the first aspect, process 1400 includes determining that at least one of the active session or the call on hold is terminated, unblocking transmission of one or more inter-RAT measurement reports based at least in part on the determination that at least one of the active session or the call on hold is terminated to enable the UE to transmit the one or more inter-RAT measurement reports based at least in part on an inter-RAT measurement control command.

In a third aspect, alone or in combination with one or more of the first and second aspects, the first RAT is a New Radio RAT and the second RAT is a Long Term Evolution RAT.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
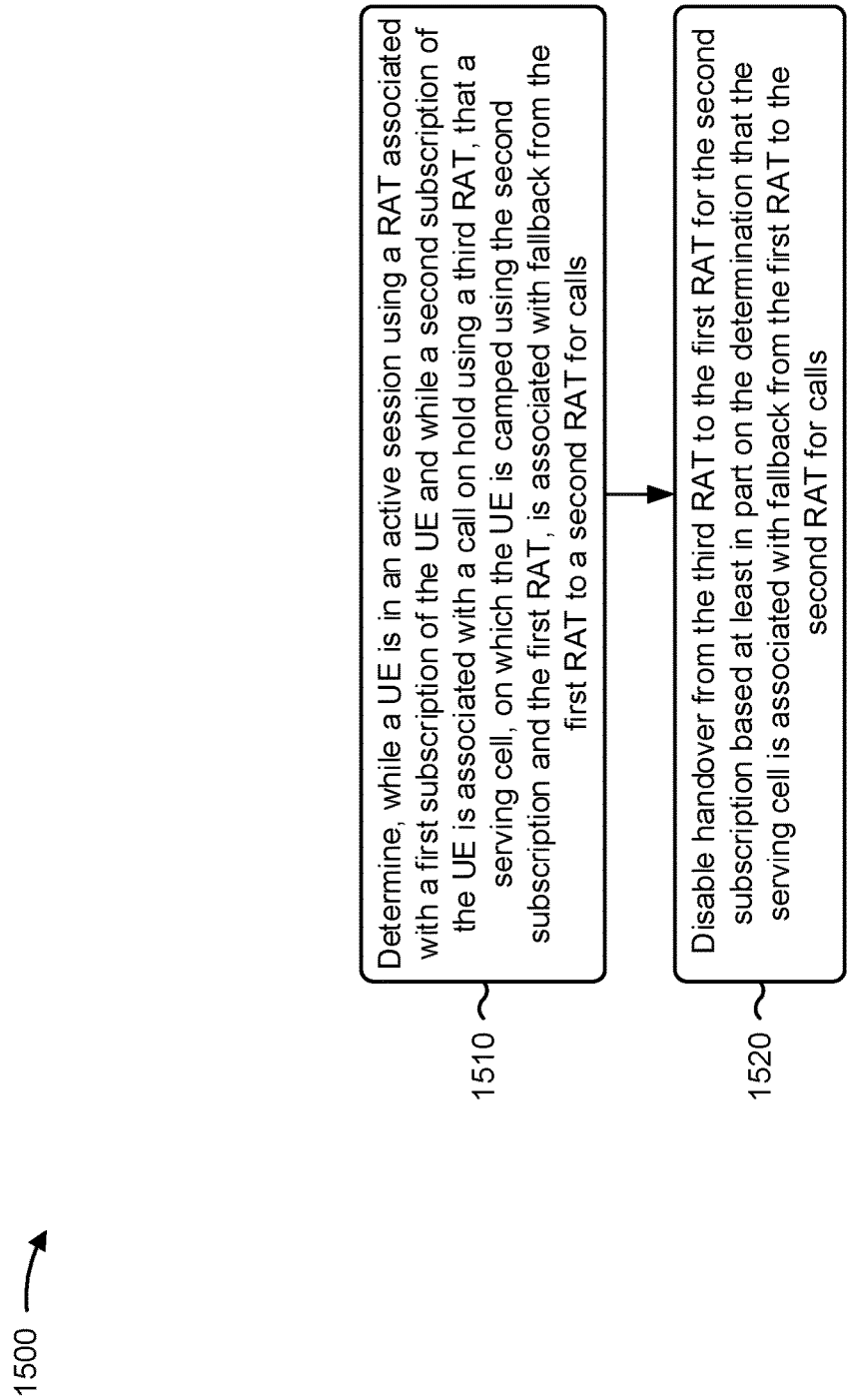

FIG. 15 is a diagram illustrating an example process 1500 performed, for example, by a UE, in accordance with the present disclosure. Example process 1500 is an example where the UE (e.g., UE 120) performs operations associated with techniques for handling calls associated with UE transition from dual active mode to dual standby mode.

As shown in FIG. 15, in some aspects, process 1500 may include determining, while the UE is in an active session using a first RAT associated with a first subscription of the UE and while a second subscription of the UE is associated with a call on hold using a third RAT, that a serving cell, on which the UE is camped using the second subscription and the first RAT, is associated with fallback from the first RAT to a second RAT for calls (block 1510). For example, the UE (e.g., using determination component 1608, depicted in FIG. 16) may determine, while the UE is in an active session using a first RAT associated with a first subscription of the UE and while a second subscription of the UE is associated with a call on hold using a third RAT, that a serving cell, on which the UE is camped using the second subscription and the first RAT, is associated with fallback from the first RAT to a second RAT for calls, as described above.

As further shown in FIG. 15, in some aspects, process 1500 may include disabling handover from the third RAT to the first RAT for the second subscription based at least in part on the determination that the serving cell is associated with fallback from the first RAT to the second RAT for calls (block 1520). For example, the UE (e.g., using disabling component 1628, depicted in FIG. 16) may disable handover from the third RAT to the first RAT for the second subscription based at least in part on the determination that the serving cell is associated with fallback from the first RAT to the second RAT for calls, as described above.

Process 1500 may include additional aspects, such as any single aspect or any combination of aspects described below and/or in connection with one or more other processes described elsewhere herein.

In a first aspect, process 1500 includes determining that at least one of the active session or the call on hold is terminated, and enabling handover from the third RAT to the first RAT based at least in part on the determination that at least one of the active session or the call on hold is terminated.

In a second aspect, alone or in combination with the first aspect, the first RAT is a New Radio RAT, the second RAT is a Long Term Evolution RAT, and the third RAT is a wireless local area network RAT or a non-third generation partnership project access RAT.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
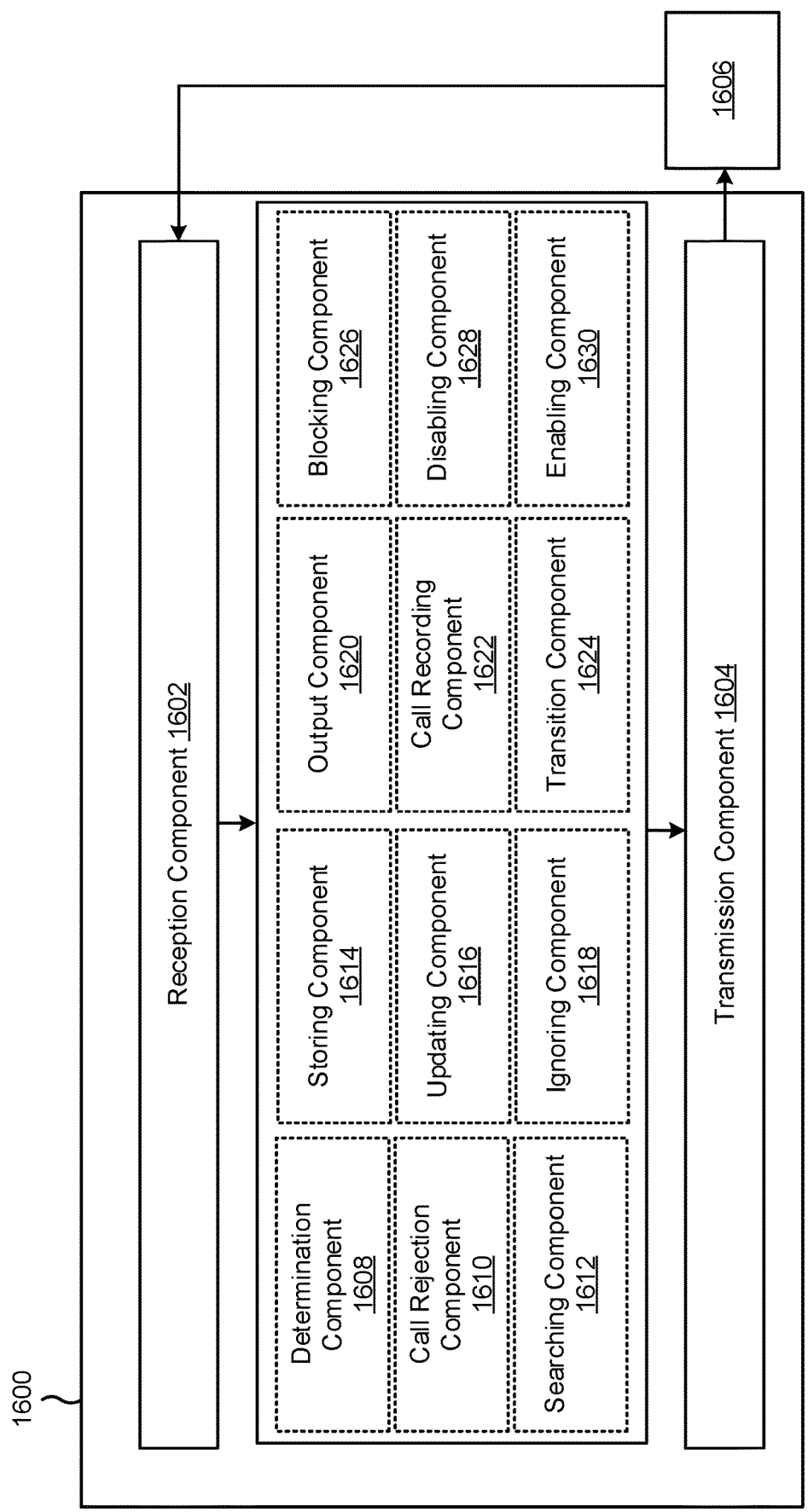
FIG. 16 is a block diagram of an example apparatus for wireless communication, in accordance with the present disclosure.

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a determination component 1608, a call rejection component 1610, a searching component 1612, a storing component 1614, an updating component 1616, an ignoring component 1618, an output component 1620, a call recording component 1622, a transition component 1624, a blocking component 1626, a disabling component 1628, or an enabling component 1630, among other examples.

In some aspects, the apparatus 1600 may be configured to perform one or more operations described herein in connection with FIGS. 6-11. Additionally, or alternatively, the apparatus 1600 may be configured to perform one or more processes described herein, such as process 1200 of FIG. 12, process 1300 of FIG. 13, process 1400 of FIG. 14, process 1500 of FIG. 15, or a combination thereof. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The reception component 1602 may receive, while the UE is in an active session using a first RAT associated with a first subscription of the UE, a call request via the first RAT, wherein the call request is associated with a second subscription of the UE. The determination component 1608 may determine that the call request is received from a serving cell that is associated with fallback from the first RAT to a second RAT for calls. The call rejection component 1610 may reject the call request or transition the second subscription to a third RAT based at least in part on the determination that the call request is received via the serving cell that is associated with fallback from the first RAT to the second RAT for calls.

The searching component 1612 may search a database that stores information indicating whether one or more cells of the first RAT are associated with fallback from the first RAT to the second RAT for calls.

The determination component 1608 may determine that the call request is received from the serving cell that is associated with fallback from the first RAT to the second RAT for calls based at least in part on searching the database.

The storing component 1614 may store, in the database, an indication that the serving cell is associated with fallback from the first RAT to the second RAT for calls based at least in part on receiving a command to fall back from the first RAT to the second RAT on the serving cell.

The updating component 1616 may update the information stored in the database based at least in part on receiving updated information from one or more other devices.

The transmission component 1604 may transmit an indication that the serving cell is associated with fallback from the first RAT to the second RAT for calls based at least in part on receiving a command to fall back from the first RAT to the second RAT on the serving cell.

The determination component 1608 may determine that the UE or the second subscription is not capable of supporting calls using the first RAT.

The call rejection component 1610 may reject the call request or transition the second subscription to the third RAT based at least in part on the determination that the UE or the second subscription is not capable of supporting calls using the first RAT.

The reception component 1602 may receive, from the serving cell, a command to fall back from the first RAT to the second RAT for the call request.

The determination component 1608 may determine that the call request is received from the serving cell that is associated with fallback from the first RAT to the second RAT for calls based at least in part on receiving the command.

The ignoring component 1618 may ignore the command.

The output component 1620 may output an indication that the call request was rejected based at least in part on rejecting the call request.

The determination component 1608 may determine that the third RAT is available for communications of the UE, wherein rejecting the call request or transitioning the second subscription to the third RAT comprises transitioning the second subscription to the third RAT based at least in part on the determination that the third RAT is available for communications of the UE.

The determination component 1608 may determine that the third RAT is not available for communications of the UE, wherein rejecting the call request or transitioning the second subscription to the third RAT comprises rejecting the call request based at least in part on the determination that the third RAT is not available for communications of the UE.

The call recording component 1622 may record a missing call based at least in part on rejecting the call request.

The determination component 1608 may determine, while the UE is in an active session using a first RAT associated with a first subscription of the UE, that a serving cell is associated with fallback from the first RAT to a second RAT for calls, wherein the UE is camped on the serving cell using a second subscription and the first RAT. The transition component 1624 may transition the second subscription to a third RAT based at least in part on the determination that the serving cell is associated with fallback from the first RAT to the second RAT for calls.

The determination component 1608 may determine that the third RAT is available for communications of the UE transitioning the second subscription to the third RAT based at least in part on the determination that the third RAT is available for communications of the UE.

The blocking component 1626 may block handover, associated with the second subscription, from the third RAT to the first RAT until the active session is terminated.

The determination component 1608 may determine that the UE is in an active session using a first RAT associated with a first subscription of the UE. The determination component 1608 may determine that a second subscription of the UE is associated with a call on hold using the first RAT while the UE is in the active session using the first RAT associated with the first subscription of the UE. The blocking component 1626 may block transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE.

The reception component 1602 may receive an inter-RAT measurement control command to transmit the inter-RAT measurement report.

The ignoring component 1618 may ignore the inter-RAT measurement control command based at least in part on the determination that the second subscription of the UE is associated with the call on hold using the first RAT while the UE is in the active session using the first RAT associated with the first subscription of the UE.

The determination component 1608 may determine, while the UE is in an active session using a first RAT associated with a first subscription of the UE and while a second subscription of the UE is associated with a call on hold using a third RAT, that a serving cell, on which the UE is camped using the second subscription and the first RAT, is associated with fallback from the first RAT to a second RAT for calls. The disabling component 1628 may disable handover from the third RAT to the first RAT for the second subscription based at least in part on the determination that the serving cell is associated with fallback from the first RAT to the second RAT for calls.

The determination component 1608 may determine that at least one of the active session or the call on hold is terminated.

The enabling component 1630 may enable handover from the third RAT to the first RAT based at least in part on the determination that at least one of the active session or the call on hold is terminated.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving, while the UE is in an active session using a first radio access technology (RAT) associated with a first subscription of the UE, a call request via the first RAT, wherein the call request is associated with a second subscription of the UE; determining that the call request is received from a serving cell that is associated with fallback from the first RAT to a second RAT for calls; and rejecting the call request or transitioning the second subscription to a third RAT based at least in part on the determination that the call request is received via the serving cell that is associated with fallback from the first RAT to the second RAT for calls.

Aspect 2: The method of Aspect 1, further comprising: searching a database that stores information indicating whether one or more cells of the first RAT are associated with fallback from the first RAT to the second RAT for calls; and determining that the call request is received from the serving cell that is associated with fallback from the first RAT to the second RAT for calls based at least in part on searching the database.

Aspect 3: The method of Aspect 2, further comprising storing, in the database, an indication that the serving cell is associated with fallback from the first RAT to the second RAT for calls based at least in part on receiving a command to fall back from the first RAT to the second RAT on the serving cell.

Aspect 4: The method of any of Aspects 2-3, further comprising updating the information stored in the database based at least in part on receiving updated information from one or more other devices.

Aspect 5: The method of any of Aspects 1-4, further comprising transmitting an indication that the serving cell is associated with fallback from the first RAT to the second RAT for calls based at least in part on receiving a command to fall back from the first RAT to the second RAT on the serving cell.

Aspect 6: The method of any of Aspects 1-5, further comprising: determining that the UE or the second subscription is not capable of supporting calls using the first RAT; and rejecting the call request or transitioning the second subscription to the third RAT based at least in part on the determination that the UE or the second subscription is not capable of supporting calls using the first RAT.

Aspect 7: The method of any of Aspects 1-6, further comprising: receiving, from the serving cell, a command to fall back from the first RAT to the second RAT for the call request; and determining that the call request is received from the serving cell that is associated with fallback from the first RAT to the second RAT for calls based at least in part on receiving the command.

Aspect 8: The method of Aspect 7, further comprising ignoring the command.

Aspect 9: The method of Aspect 1, further comprising outputting, via one or more output components of the UE, an indication that the call request was rejected based at least in part on rejecting the call request.

Aspect 10: The method of any of Aspects 1-9, further comprising determining that the third RAT is available for communications of the UE; and wherein rejecting the call request or transitioning the second subscription to the third RAT comprises transitioning the second subscription to the third RAT based at least in part on the determination that the third RAT is available for communications of the UE.

Aspect 11: The method of any of Aspects 1-9, further comprising determining that the third RAT is not available for communications of the UE; and wherein rejecting the call request or transitioning the second subscription to the third RAT comprises rejecting the call request based at least in part on the determination that the third RAT is not available for communications of the UE.

Aspect 12: The method of any of Aspects 1-11, further comprising recording a missing call based at least in part on rejecting the call request.

Aspect 13: The method of any of Aspects 1-12, wherein the first RAT is a New Radio RAT, the second RAT is a Long Term Evolution RAT, and the third RAT is a wireless local area network RAT or a non-third generation partnership project access RAT.

Aspect 14: A method of wireless communication performed by a user equipment (UE), comprising: determining, while the UE is in an active session using a first radio access technology (RAT) associated with a first subscription of the UE, that a serving cell is associated with fallback from the first RAT to a second RAT for calls, wherein the UE is camped on the serving cell using a second subscription and the first RAT; and transitioning the second subscription to a third RAT based at least in part on the determination that the serving cell is associated with fallback from the first RAT to the second RAT for calls.

Aspect 15: The method of Aspect 14, further comprising determining that the third RAT is available for communications of the UE; and transitioning the second subscription to the third RAT based at least in part on the determination that the third RAT is available for communications of the UE.

Aspect 16: The method of any of Aspects 14-15, wherein transitioning the second subscription to the third RAT comprises transitioning an Internet Protocol Multimedia Subsystem (IMS) protocol data unit (PDU) session from the first RAT to the third RAT.

Aspect 17: The method of any of Aspects 14-16, further comprising blocking handover, associated with the second subscription, from the third RAT to the first RAT until the active session is terminated.

Aspect 18: The method of any of Aspects 14-17, wherein the first RAT is a New Radio RAT, the second RAT is a Long Term Evolution RAT, and the third RAT is a wireless local area network RAT or a non-third generation partnership project access RAT.

Aspect 19: A method of wireless communication performed by a user equipment (UE), comprising: determining that the UE is in an active session using a first radio access technology (RAT) associated with a first subscription of the UE; determining that a second subscription of the UE is associated with a call on hold using the first RAT while the UE is in the active session using the first RAT associated with the first subscription of the UE; and blocking transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE.

Aspect 20: The method of Aspect 19, further comprising: receiving an inter-RAT measurement control command to transmit the inter-RAT measurement report; and ignoring the inter-RAT measurement control command based at least in part on the determination that the second subscription of the UE is associated with the call on hold using the first RAT while the UE is in the active session using the first RAT associated with the first subscription of the UE.

Aspect 21: The method of any of Aspects 19-20, further comprising: determining that at least one of the active session or the call on hold is terminated; and unblocking transmission of one or more inter-RAT measurement reports based at least in part on the determination that at least one of the active session or the call on hold is terminated to enable the UE to transmit the one or more inter-RAT measurement reports based at least in part on an inter-RAT measurement control command.

Aspect 22: The method of any of Aspects 19-21, wherein the first RAT is a New Radio RAT and the second RAT is a Long Term Evolution RAT.

Aspect 23: A method of wireless communication performed by a user equipment (UE), comprising: determining, while the UE is in an active session using a first radio access technology (RAT) associated with a first subscription of the UE and while a second subscription of the UE is associated with a call on hold using a third RAT, that a serving cell, on which the UE is camped using the second subscription and the first RAT, is associated with fallback from the first RAT to a second RAT for calls; and disabling handover from the third RAT to the first RAT for the second subscription based at least in part on the determination that the serving cell is associated with fallback from the first RAT to the second RAT for calls.

Aspect 24: The method of Aspect 23, further comprising: determining that at least one of the active session or the call on hold is terminated; and enabling handover from the third RAT to the first RAT based at least in part on the determination that at least one of the active session or the call on hold is terminated.

Aspect 25: The method of any of Aspects 23-24, wherein the first RAT is a New Radio RAT, the second RAT is a Long Term Evolution RAT, and the third RAT is a wireless local area network RAT or a non-third generation partnership project access RAT.

Aspect 26: An apparatus for wireless communication at a device, comprising a processor; memory coupled with the processor; and instructions stored in the memory and executable by the processor to cause the apparatus to perform the method of one or more Aspects of Aspects 1-25.

Aspect 27: A device for wireless communication, comprising a memory and one or more processors coupled to the memory, the memory and the one or more processors configured to perform the method of one or more Aspects of Aspects 1-25.

Aspect 28: An apparatus for wireless communication, comprising at least one means for performing the method of one or more Aspects of Aspects 1-25.

Aspect 29: A non-transitory computer-readable medium storing code for wireless communication, the code comprising instructions executable by a processor to perform the method of one or more Aspects of Aspects 1-25.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, while the UE is in an active session using a first radio access technology (RAT) associated with a first subscription of the UE, a call request via the first RAT, wherein the call request is associated with a second subscription of the UE;
    searching a database that stores information indicating whether one or more cells of the first RAT are associated with fallback from the first RAT to a second RAT for calls;
    determining, based at least in part on searching the database, that the call request is received from a serving cell that is associated with fallback from the first RAT to the second RAT for calls; and
    rejecting the call request or transitioning the second subscription to a third RAT based at least in part on the determination that the call request is received via the serving cell that is associated with fallback from the first RAT to the second RAT for calls.

2. The method of claim 1, further comprising storing, in the database, an indication that the serving cell is associated with fallback from the first RAT to the second RAT for calls based at least in part on receiving a command to fall back from the first RAT to the second RAT on the serving cell.

3. The method of claim 1, further comprising updating the information stored in the database based at least in part on receiving updated information from one or more other devices.

4. The method of claim 1, further comprising transmitting an indication that the serving cell is associated with fallback from the first RAT to the second RAT for calls based at least in part on receiving a command to fall back from the first RAT to the second RAT on the serving cell.

5. The method of claim 1, further comprising:
    determining that the UE or the second subscription is not capable of supporting calls using the first RAT; and
    rejecting the call request or transitioning the second subscription to the third RAT based at least in part on the determination that the UE or the second subscription is not capable of supporting calls using the first RAT.

6. The method of claim 1, further comprising:
    receiving, from the serving cell, a command to fall back from the first RAT to the second RAT for the call request; and
    determining that the call request is received from the serving cell that is associated with fallback from the first RAT to the second RAT for calls based at least in part on receiving the command.

7. The method of claim 6, further comprising ignoring the command.

8. The method of claim 1, further comprising outputting, via one or more output components of the UE, an indication that the call request was rejected based at least in part on rejecting the call request.

9. The method of claim 1, further comprising determining that the third RAT is available for communications of the UE; and
    wherein rejecting the call request or transitioning the second subscription to the third RAT comprises transitioning the second subscription to the third RAT based at least in part on the determination that the third RAT is available for communications of the UE.

10. The method of claim 1, further comprising determining that the third RAT is not available for communications of the UE; and
    wherein rejecting the call request or transitioning the second subscription to the third RAT comprises rejecting the call request based at least in part on the determination that the third RAT is not available for communications of the UE.

11. The method of claim 1, further comprising recording a missing call based at least in part on rejecting the call request.

12. The method of claim 1, wherein the first RAT is a New Radio RAT, the second RAT is a Long Term Evolution RAT, and the third RAT is a wireless local area network RAT or a non-third generation partnership project access RAT.

13. A method of wireless communication performed by a user equipment (UE), comprising:
    determining that the UE is in an active session using a first radio access technology (RAT) associated with a first subscription of the UE;
    determining that a second subscription of the UE is associated with a call on hold using the first RAT while the UE is in the active session using the first RAT associated with the first subscription of the UE; and
    blocking transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE.

14. The method of claim 13, further comprising:
    receiving an inter-RAT measurement control command to transmit the inter-RAT measurement report; and
    ignoring the inter-RAT measurement control command based at least in part on the determination that the second subscription of the UE is associated with the call on hold using the first RAT while the UE is in the active session using the first RAT associated with the first subscription of the UE.

15. The method of claim 13, further comprising:
  determining that at least one of the active session or the call on hold is terminated; and
  unblocking transmission of one or more inter-RAT measurement reports based at least in part on the determination that at least one of the active session or the call on hold is terminated to enable the UE to transmit the one or more inter-RAT measurement reports based at least in part on an inter-RAT measurement control command.

16. The method of claim 13, wherein the first RAT is a New Radio RAT and the second RAT is a Long Term Evolution RAT.

17. A user equipment (UE) for wireless communication, comprising:
  one or more memories; and
  one or more processors operatively coupled to the one or more memories, the one or more processors configured to:
    receive, while the UE is in an active session using a first radio access technology (RAT) associated with a first subscription of the UE, a call request via the first RAT, wherein the call request is associated with a second subscription of the UE;
    search a database that stores information indicating whether one or more cells of the first RAT are associated with fallback from the first RAT to a second RAT for calls;
    determine, based at least in part on searching the database, that the call request is received from a serving cell that is associated with fallback from the first RAT to the second RAT for calls; and
    reject the call request or transition the second subscription to a third RAT based at least in part on the determination that the call request is received via the serving cell that is associated with fallback from the first RAT to the second RAT for calls.

18. The UE of claim 17, wherein the UE is further configured to store, in the database, an indication that the serving cell is associated with fallback from the first RAT to the second RAT for calls based at least in part on receiving a command to fall back from the first RAT to the second RAT on the serving cell.

19. The UE of claim 17, wherein the UE is further configured to transmit an indication that the serving cell is associated with fallback from the first RAT to the second RAT for calls based at least in part on receiving a command to fall back from the first RAT to the second RAT on the serving cell.

20. The UE of claim 17, wherein the UE is further configured to:
  determine that the UE or the second subscription is not capable of supporting calls using the first RAT; and
  reject the call request or transition the second subscription to the third RAT based at least in part on the determination that the UE or the second subscription is not capable of supporting calls using the first RAT.

21. The UE of claim 17, wherein the UE is further configured to:
  receive, from the serving cell, a command to fall back from the first RAT to the second RAT for the call request; and
  determine that the call request is received from the serving cell that is associated with fallback from the first RAT to the second RAT for calls based at least in part on receiving the command.

22. The UE of claim 17, wherein the UE is further configured to output, via one or more output components of the UE, an indication that the call request was rejected based at least in part on rejecting the call request.

23. The UE of claim 17, wherein the UE is further configured to determine that the third RAT is available for communications of the UE; and
  wherein the UE, when rejecting the call request or transitioning the second subscription to the third RAT, is configured to transition the second subscription to the third RAT based at least in part on the determination that the third RAT is available for communications of the UE.

24. The UE of claim 17, wherein the UE is further configured to determine that the third RAT is not available for communications of the UE; and
  wherein the UE, when rejecting the call request or transitioning the second subscription to the third RAT, is configured to reject the call request based at least in part on the determination that the third RAT is not available for communications of the UE.

25. The UE of claim 17, wherein the UE is further configured to record a missing call based at least in part on rejecting the call request.

26. The UE of claim 17, wherein the UE is further configured to update the information stored in the database based at least in part on receiving updated information from one or more other devices.

27. A user equipment (UE) for wireless communication, comprising:
  one or more memories; and
  one or more processors operatively coupled to the one or more memories, the one or more processors configured to:
    determine that the UE is in an active session using a first radio access technology (RAT) associated with a first subscription of the UE;
    determine that a second subscription of the UE is associated with a call on hold using the first RAT while the UE is in the active session using the first RAT associated with the first subscription of the UE; and
    block transmission of an inter-RAT measurement report associated with the first RAT and a second RAT based at least in part on the determination that the second subscription of the UE is associated with the call on hold using the first RAT while the UE is in the active session using the first RAT associated with the first subscription of the UE.

28. The UE of claim 27, wherein the UE is further configured to:
  receive an inter-RAT measurement control command to transmit the inter-RAT measurement report; and
  ignore the inter-RAT measurement control command based at least in part on the determination that the second subscription of the UE is associated with the call on hold using the first RAT while the UE is in the active session using the first RAT associated with the first subscription of the UE.

29. The UE of claim 27, wherein the UE is further configured to:
  determine that at least one of the active session or the call on hold is terminated; and
  unblock transmission of one or more inter-RAT measurement reports based at least in part on the determination that at least one of the active session or the call on hold is terminated to enable the UE to transmit the one or more inter-RAT measurement reports based at least in part on an inter-RAT measurement control command.

30. The UE of claim 27, wherein the first RAT is a New Radio RAT and the second RAT is a Long Term Evolution RAT.

* * * * *